US012116829B1

(12) United States Patent
Hanson et al.

(10) Patent No.: US 12,116,829 B1
(45) Date of Patent: Oct. 15, 2024

(54) FENESTRATION ASSEMBLY MULL JOINTS WITH IMPROVED STRENGTH AND METHODS

(71) Applicant: Andersen Corporation, Bayport, MN (US)

(72) Inventors: Christopher Hanson, Fridley, MN (US); Arik Van Asten, St. Paul, MN (US)

(73) Assignee: Andersen Corporation, Bayport, MN (US)

( * ) Notice: Subject to any disclaimer, the term of this patent is extended or adjusted under 35 U.S.C. 154(b) by 0 days.

(21) Appl. No.: 17/939,384

(22) Filed: Sep. 7, 2022

Related U.S. Application Data

(60) Provisional application No. 63/242,167, filed on Sep. 9, 2021.

(51) Int. Cl.
*E06B 1/60* (2006.01)
*E06B 1/36* (2006.01)

(52) U.S. Cl.
CPC ............ *E06B 1/366* (2013.01); *E06B 1/6007* (2013.01)

(58) Field of Classification Search
CPC ........ E06B 1/366; E06B 1/6007; E06B 1/363; E06B 1/68; E06B 1/38; E06B 1/524; E06B 3/356; E06B 3/9616; E06B 3/9624
See application file for complete search history.

(56) References Cited

U.S. PATENT DOCUMENTS

| | | | |
|---|---|---|---|
| 1,760,265 | A | 5/1930 | Carr |
| 3,103,710 | A | 9/1963 | Fredrickson |
| 3,711,995 | A | 1/1973 | Anderson |
| 3,923,411 | A | 12/1975 | Berghman |
| 3,967,911 | A | 7/1976 | Miers |
| 3,975,875 | A | 8/1976 | Goss, Jr. |
| 4,076,439 | A | 2/1978 | Sakashita |
| 4,188,764 | A | 2/1980 | Gode |
| 4,272,941 | A | 6/1981 | Hasselbacher et al. |
| 4,328,644 | A | 5/1982 | Scott et al. |
| 4,691,489 | A | 9/1987 | Shea, Jr. |

(Continued)

FOREIGN PATENT DOCUMENTS

| | | | |
|---|---|---|---|
| DE | 102008029935 | B3 | 12/2009 |
| GB | 2273123 | A | 6/1994 |
| WO | WO 2010/013233 | A2 | 2/2010 |

OTHER PUBLICATIONS

"Aluminum Structural Reinforcement (Factory Application)," *Sierra Pacific Windows*, Updated May 2013.

*Primary Examiner* — Kyle J. Walraed-Sullivan
(74) *Attorney, Agent, or Firm* — Mueting Raasch Group

(57) ABSTRACT

Compound fenestration assembly mull joints using joining strips and compound fenestration assemblies using those mull joints are described herein. The joining strips used in the compound fenestration assembly mull joints described herein are configured to improve the strength of the mull joints in which they are used and, therefore, the ability of the resulting compound fenestration assemblies to maintain integrity when subjected to, e.g., wind loads and other forces is improved. The benefits of the mull joints and the compound fenestration assemblies incorporating them as described herein may be enhanced with an increase in the number of adjacent fenestration units (and, therefore, mull joints) in a given compound fenestration assembly.

17 Claims, 10 Drawing Sheets

(56) References Cited

U.S. PATENT DOCUMENTS

| | | | |
|---|---|---|---|
| 4,809,463 A | 3/1989 | Schroder et al. | |
| 4,810,321 A | 3/1989 | Wank et al. | |
| 4,811,533 A | 3/1989 | Wetsel | |
| 4,924,647 A | 5/1990 | Drucker | |
| 5,076,034 A | 12/1991 | Bandy | |
| 5,435,106 A | 7/1995 | Garries et al. | |
| 5,485,705 A | 1/1996 | Guillemet | |
| 5,540,019 A | 7/1996 | Beske et al. | |
| 5,625,992 A | 5/1997 | Strick et al. | |
| 5,910,086 A | 6/1999 | Fisher | |
| 5,941,033 A | 8/1999 | Adams | |
| 5,941,046 A | 8/1999 | Prather | |
| 6,082,674 A | 7/2000 | White et al. | |
| 6,138,419 A | 10/2000 | Sekiguchi et al. | |
| 6,148,883 A | 11/2000 | Wilson | |
| 6,173,542 B1 | 1/2001 | Wright | |
| 6,360,498 B1 | 3/2002 | Westphal | |
| 6,389,763 B1 | 5/2002 | Clauss | |
| 6,449,903 B1 | 9/2002 | Borcherding | |
| 6,494,002 B1 | 12/2002 | Gieseke | |
| 6,500,558 B2 | 12/2002 | Yamaguchi | |
| 6,523,311 B2 | 2/2003 | Edger | |
| 6,560,944 B1 | 5/2003 | Wilson | |
| 6,662,512 B2 | 12/2003 | Westphal | |
| 6,722,089 B2 | 4/2004 | Budzinski | |
| 6,745,523 B2 | 6/2004 | Petta | |
| D493,234 S | 7/2004 | Vastine | |
| 6,807,778 B2 | 10/2004 | Engebretson | |
| 6,811,893 B2 | 11/2004 | Wakayama et al. | |
| 6,829,865 B2 | 12/2004 | Smith | |
| 7,010,888 B2 | 3/2006 | Tumlin et al. | |
| D565,199 S * | 3/2008 | Westphal | D25/122 |
| 7,454,865 B2 | 11/2008 | Kerscher | |
| 7,481,028 B2 | 1/2009 | Tufts et al. | |
| 8,061,103 B2 | 11/2011 | McMahon | |
| 8,266,851 B2 | 9/2012 | Campbell et al. | |
| 8,464,480 B2 | 6/2013 | Libby et al. | |
| 8,756,884 B2 | 6/2014 | Tufts et al. | |
| 9,316,040 B2 | 4/2016 | Saunders et al. | |
| 9,932,765 B1 | 4/2018 | Kelley et al. | |
| 10,233,688 B1 | 3/2019 | Kelley et al. | |
| 10,626,664 B1 | 4/2020 | Kelley et al. | |
| 10,968,687 B1 | 4/2021 | Kelley et al. | |
| 11,499,364 B1 | 11/2022 | Kelley et al. | |
| 2002/0092248 A1 * | 7/2002 | Westphal | E06B 1/6007 52/204.5 |
| 2003/0217523 A1 | 11/2003 | Budzinski | |
| 2004/0187408 A1 | 9/2004 | Smith | |
| 2004/0200163 A1 | 10/2004 | Wright | |
| 2005/0050815 A1 | 3/2005 | Engebretson | |
| 2005/0193654 A1 | 9/2005 | Primozich | |
| 2008/0216424 A1 * | 9/2008 | Westphal | E06B 1/6007 52/204.5 |
| 2010/0192488 A1 | 8/2010 | Campbell et al. | |
| 2015/0010350 A1 | 1/2015 | Emanuel | |

* cited by examiner

FENESTRATION ASSEMBLY MULL JOINTS WITH IMPROVED STRENGTH AND METHODS

RELATED APPLICATION

This application claims the benefit of U.S. Provisional Application No. 63/242,167, filed Sep. 9, 2021, the disclosure of which is incorporated by reference herein in its entirety.

Compound fenestration assembly mull joints with improved strength and compound fenestration assemblies using those mull joints are described herein.

BACKGROUND

Compound fenestration assemblies, sometimes referred to as mulled fenestration assemblies, are formed by attaching two or more individual fenestration units (e.g., windows and/or doors) along one or more mull joints to form a combination of windows, doors, or windows and doors, that can be handled and installed as a single assembly, and which give the appearance of being a single assembly.

SUMMARY

Compound fenestration assembly mull joints offering improved strength in a narrow mull joint width and compound fenestration assemblies using those mull joints are described herein.

The joining strips used in the compound fenestration assembly mull joints described herein are configured to improve the strength of the mull joints in which they are used and, therefore, the ability of the resulting compound fenestration assemblies to maintain integrity when subjected to, e.g., wind loads and other forces is improved. The benefits of the mull joints and the compound fenestration assemblies incorporating them as described herein may be enhanced with an increase in the number of adjacent fenestration units (and, therefore, mull joints) in a given compound fenestration assembly.

The improved strength of the mull joints described herein is provided in combination with relatively narrow mull joints, e.g., mull joints having a width of about 0.5 inches or less. Limiting mull joint width can be difficult in mull joints formed using pairs of joining strips with interlocking channels because the narrower width provides less room between the adjacent fenestration units for the joining strips. If the thinner joining strips are required to provide the narrower mull joints, the thinner joining strips are weaker, resulting in mull joints that are also correspondingly weaker.

The mull joints described herein, however, include fenestration units having frame cavities in the frame members and reinforcing ribs on the joining strips, with the reinforcing ribs extending into the frame cavities. The reinforcing ribs on the joining strips increase the strength of the joining strips (by, e.g., increasing the moment of inertia of the joining strips) and the frame cavities on the fenestration unit frame members provide space for the reinforcing ribs without requiring more distance between the fenestration units. Further increases in mull joint strength while limiting mull joint width is achieved by providing a plurality of both the reinforcing ribs and the frame cavities in the mull joints described herein.

In one or more embodiments of the mull joints of compound fenestration assemblies as described herein, one or more of the reinforcing ribs on the joining strips defines a retaining channel that mechanically interlocks with a frame channel on the mull surface of a frame member of the fenestration unit to which the joining strip is attached. The mechanical interlock between the retaining channel on the joining strip and the frame channel on the frame member prevents movement of the joining strip away from the frame member along a separation axis (i.e., an axis extending across the mull joint between the attached fenestration units of the compound fenestration assembly). The joining strip and frame member on the opposite side of the mull joint may also include mechanically interlocking retaining and frame channels. The mechanically interlocking channels on the joining strips and frame members provide a mull joint having an improved strength as compared to mull joints lacking the mechanically interlocking channels between the joining strips and the frame members. The improved strength offered by both the reinforcing ribs on the joining strips and the mechanically interlocking channels on the joining strips and the frame members can, in one or more embodiments, provide a mull joint having a reduced width that still provides sufficient strength to maintain integrity of the compound fenestration assembly incorporating the mull joint when subjected to, e.g., wind loads and other forces. In addition to providing improved strength, interlocking joining strips may also provide a convenient technique for properly positioning the joining strips on the frame of a fenestration unit.

In one or more embodiments of the mull joints of compound fenestration assemblies as described herein, the joining strips may include one or more flanges extending away from the joining strips on the interior and/or exterior sides of the fenestration units joined using the mull joint. When used in a mull joint as described herein, the flanged joining strips provide a mull joint having an improved strength due to, e.g., further increases in the moment of inertia of the flanged joining strips as compared to mull joints lacking the flanges. The improved strength of the joining strips translates into improved mull joint strength in a narrow mull joint that still provides sufficient strength to maintain integrity of the compound fenestration assembly incorporating the mull joint when subjected to, e.g., wind loads and other forces. In addition to providing improved strength, flanged joining strips may also provide a convenient technique for properly positioning the joining strips on the frame members of fenestration units.

In one or more embodiments, the mull joints used to construct compound fenestration assemblies as described herein do not require disassembly of the fenestration units forming the compound fenestration assembly to connect adjacent fenestration units in a compound fenestration assembly in a building opening.

In one or more embodiments, the mull joints used to construct compound fenestration assemblies as described herein do not impact visible areas of the individual fenestration units forming the compound fenestration assemblies, e.g., the mull joints do not require fasteners to be located in positions where they could be exposed on one or more of the fenestration units of a compound fenestration assembly as described herein.

In a first aspect, one or more embodiments of a compound fenestration assembly as described herein includes: a first frame member of a first fenestration unit attached to a second frame member of a second fenestration unit along a mull joint having a first end and a second end, wherein the mull joint defines a mull joint axis extending along a length of the mull joint between the first and second ends of the mull joint, wherein the first and second frame members comprise exterior sides facing in the same direction and interior sides facing in an opposite direction from the exterior sides, wherein an interior/exterior axis extends between the interior and exterior sides of the first and second frame members in a direction transverse to the mull joint axis, wherein the first frame member faces the second frame member across the mull joint, wherein a separation axis extends through the mull joint between the first and second frame members, the separation axis extending in a direction transverse to both the mull joint axis and the interior/exterior axis. The first frame member defines a first frame member mull surface facing the second frame member across the mull joint, the first frame member mull surface defining a first frame member mull plane extending between the interior side and the exterior side of the first frame member and along a length of the first frame member from the first end to the second end of the mull joint, the first frame member comprising a first member frame cavity extending into the first frame member such that the first frame cavity is located between the first frame member mull plane and the first frame member mull surface, the first frame member cavity aligned with and extending along the mull joint axis, the first frame member cavity located between the interior and exterior sides of the first frame member along the interior/exterior axis. The second frame member defines a second frame member mull surface facing the first frame member across the mull joint, the second frame member comprising a second member frame cavity extending into the second frame member in a direction away from the first frame member, the second frame member cavity aligned with and extending along the mull joint axis, the second frame member cavity located between the interior and exterior sides of the second frame member along the interior/exterior axis. The compound fenestration unit assembly further includes a first joining strip attached to the first frame member of the first fenestration unit, the first joining strip comprising a mulling channel aligned with the mull joint axis, the mulling channel opening towards the exterior side of the first frame member, the first joining strip comprising a first web extending from an interior edge proximate the interior side of the first frame member to an exterior edge proximate the exterior side of the first frame member; and a second joining strip attached to the second frame member of the second fenestration unit, the second joining strip comprising a mulling channel aligned with the mull joint axis, the mulling channel opening towards the interior side of the second frame member such that the mulling channel on the first joining strip nests with the mulling channel on the second joining strip, wherein the nested mulling channels prevent movement of the first frame member away from the second frame member along the separation axis, prevent movement of the first frame member towards the exterior side of the second frame member along the interior/exterior axis, and prevent movement of the second frame member towards the interior side of the first frame member along the interior/exterior axis, and wherein the second joining strip comprises a second web extending from an interior edge proximate the interior side of the second frame member to an exterior edge proximate the exterior side of the second frame member. The first frame member defines a first frame member mull surface facing the second frame member across the mull joint, the first frame member comprising a plurality of first member frame cavities extending into the first frame member in a direction away from the second frame member, wherein each first frame member cavity of the plurality of first frame member cavies is aligned with and extends along the mull joint axis, the plurality of first frame member cavities located between the interior and exterior sides of the first frame member. The second frame member defines a second frame member mull surface facing the first frame member across the mull joint, the second frame member comprising a plurality of second member frame cavities extending into the second frame member in a direction away from the first frame member, wherein each second frame member cavity of the plurality of second member frame cavities is aligned with and extends along the mull joint axis, the plurality of second member frame cavities located between the interior and exterior sides of the second frame member. The first joining strip comprises a plurality of reinforcing ribs extending from the web of the first joining strip towards the first frame member, the plurality of reinforcing ribs located between the interior and exterior edges of the first joining strip, wherein each reinforcing rib of the plurality of reinforcing ribs extends into a selected first member frame cavity of the plurality of first frame member cavities such that each reinforcing rib of the plurality of reinforcing ribs is intersected by the first frame member mull plane such that the at least a portion of each reinforcing rib is located between the first frame member mull plane and the first frame member mull surface.

In one or more embodiments of a compound fenestration assembly according to the first aspect, two reinforcing ribs of the plurality of reinforcing ribs extend into the selected first frame member frame cavity.

In one or more embodiments of a compound fenestration assembly according to the first aspect, adjacent pairs of first frame member cavities of the plurality of first member frame cavities are separated by an intermediate support extending along the mull axis on the first frame member mull surface. In one or more embodiments, the intermediate support comprises a distal edge in contact with the web of the first joining strip between an adjacent pair of reinforcing ribs extending from the web of the first joining strip.

In one or more embodiments of a compound fenestration assembly according to the first aspect, the second frame member mull surface defines a second frame member mull plane extending between the interior side and the exterior side of the second frame member and along a length of the second frame member from the first end to the second end of the mull joint, wherein a mull joint thickness measured along the separation axis is defined by a distance between the first frame member mull plane and the second frame member mull plane at the interior sides of the first and second frame members, wherein the first and second joining strips define a joining strip thickness measured along the separation axis, and wherein the joining strip thickness measured through a selected reinforcing rib of the plurality of reinforcing ribs is greater than the mull joint thickness.

In one or more embodiments of a compound fenestration assembly according to the first aspect, a selected reinforcing rib of the plurality of reinforcing ribs defines a first retaining channel opening towards a selected side of the mull joint comprising one of the exterior side and the interior side of the first frame member; wherein a selected first frame member cavity of the plurality of first member frame cavities comprises a first frame channel opening away from the selected side of the mull joint, and wherein the first retaining channel mechanically interlocks with the first frame channel such that movement of the first joining strip away from the first frame member along the separation axis is prevented and movement of the first joining strip towards the selected side of the first frame member along the interior/exterior axis is prevented. In one or more embodiments, adjacent pairs of first frame member cavities of the plurality of first member frame cavities are separated by an intermediate support extending along the mull axis on the first frame member mull surface, and wherein the first frame channel is formed by the intermediate support. In one or more embodiments, the first retaining channel is located between the first frame member mull plane and the first frame member mull surface.

In one or more embodiments of a compound fenestration assembly according to the first aspect, the first joining strip comprises an exterior flange located along the exterior edge of the web of the first joining strip and an interior flange located along the interior edge of the web of the first joining strip, wherein the exterior flange and the interior flange both extend away from the mull joint to a free edge in a direction aligned with the separation axis such that a portion of the first frame member of the first fenestration unit is located between the exterior flange and the interior flange of the first joining strip. In one or more embodiments, the first frame member and the first joining strip comprise an interference fit between the exterior flange and the interior flange.

In a second aspect, one or more embodiments of a compound fenestration assembly as described herein include: a first frame member of a first fenestration unit attached to a second frame member of a second fenestration unit along a mull joint having a first end and a second end, wherein the mull joint defines a mull joint axis extending along a length of the mull joint between the first and second ends of the mull joint, wherein the first and second frame members comprise exterior sides facing in the same direction and interior sides facing in an opposite direction from the exterior sides, wherein an interior/exterior axis extends between the interior and exterior sides of the first and second frame members in a direction transverse to the mull joint axis, wherein the first frame member faces the second frame member across the mull joint, wherein a separation axis extends through the mull joint between the first and second frame members, the separation axis extending in a direction transverse to both the mull joint axis and the interior/exterior axis. The compound fenestration unit assembly also includes a first joining strip attached to the first frame member of the first fenestration unit, the first joining strip comprising a mulling channel aligned with the mull joint axis, the mulling channel opening towards the exterior side of the first frame member; and a second joining strip attached to the second frame member of the second fenestration unit, the second joining strip comprising a mulling channel aligned with the mull joint axis, the mulling channel on the second joining strip opening towards the interior side of the second frame member such that the mulling channel on the first joining strip mechanically interlocks with the mulling channel on the second joining strip, wherein the mechanically interlocking mulling channels prevent movement of the first frame member away from the second frame member along the separation axis, prevent movement of the first frame member towards the exterior side of the second frame member along the interior/exterior axis, and prevent movement of the second frame member towards the interior side of the first frame member along the interior/exterior axis. The first joining strip comprises a pair of retaining channels facing the first frame member of the first fenestration unit, wherein a first retaining channel of the pair of retaining channels opens towards the exterior side of the first frame member and a second retaining channel of the pair of retaining channels opens towards the interior side of the first frame member. The first frame member of the first fenestration unit comprises a first frame channel facing the first joining strip, wherein the first frame channel opens towards the interior side of the first frame member, and wherein the first retaining channel of the first joining strip mechanically interlocks with the first frame channel, wherein the mechanically interlocking first retaining channel and first frame channel prevent movement of the first joining strip away from the first frame member along the separation axis and also prevent movement of the first joining strip towards the exterior side of the first frame member along the interior/exterior axis. The second joining strip comprises a pair of retaining channels facing the second frame member of the second fenestration unit, wherein a first retaining channel of the pair of retaining channels on the second joining strip opens towards the interior side of the second frame member and a second retaining channel of the pair of retaining channels on the second joining strip opens towards the exterior side of the second frame member. The second frame member of the second fenestration unit comprises a second frame channel facing the second joining strip, wherein the second frame channel opens towards the exterior side of the second frame member, and wherein the second retaining channel of the second joining strip mechanically interlocks with the second frame channel, wherein the mechanically interlocking second retaining channel and second frame channel prevent movement of the second joining strip away from the second frame member along the separation axis and also prevent movement of the second joining strip towards the exterior side of the second frame member along the interior/exterior axis.

In one or more embodiments of a compound fenestration assembly according to the second aspect, the first retaining channel and the second retaining channel on first joining strip extend along the first joining strip from the first end to the second end of the mull joint. In one or more embodiments, the frame channel on the first frame member of the first fenestration unit extends along the first frame member from the first end to the second end of the mull joint.

In one or more embodiments of a compound fenestration assembly according to the second aspect, the first retaining channel and the second retaining channel on second joining strip extend the second joining strip from the first end to the second end of the mull joint. In one or more embodiments, the frame channel on the second frame member of the second fenestration unit extends along the second frame member from the first end to the second end of the mull joint.

In one or more embodiments of a compound fenestration assembly according to the second aspect, the first retaining channel on the first joining strip is located directly opposite from the second retaining channel on the second joining strip along the separation axis.

In one or more embodiments of a compound fenestration assembly according to the second aspect, the mull joint comprises a mull joint connector cavity located between the first joining strip and the second joining strip. In one or more embodiments, the mull joint connector cavity is located between the pair of retaining channels on the first joining strip and between the pair of retaining channels on the second joining strip in a direction aligned with the interior/exterior axis.

In one or more embodiments of a compound fenestration assembly according to the second aspect, the first joining strip comprises a web extending from an interior edge proximate the interior side of the first frame member to an exterior edge proximate the exterior side of the first frame member, wherein the web comprises a reinforcing rib extending towards the first frame member. In one or more embodiments, the reinforcing rib comprises a first reinforcing rib, wherein the web of the first joining strip comprises a second reinforcing rib extending towards the extending towards the first frame member, wherein the first reinforcing rib is located between the first retaining channel and the exterior edge of the first joining strip and the second reinforcing rib is located between the second retaining channel and the interior edge of the first joining strip.

In a third aspect, one or more embodiments of a compound fenestration assembly as described herein include: a first frame member of a first fenestration unit attached to a second frame member of a second fenestration unit along a mull joint having a first end and a second end, wherein the mull joint defines a mull joint axis extending along a length of the mull joint between the first and second ends of the mull joint, wherein the first and second frame members comprise exterior sides facing in the same direction and interior sides facing in an opposite direction from the exterior sides, wherein an interior/exterior axis extends between the interior and exterior sides of the first and second frame members in a direction transverse to the mull joint axis, wherein the first frame member faces the second frame member across the mull joint, wherein a separation axis extends through the mull joint between the first and second frame members, the separation axis extending in a direction transverse to both the mull joint axis and the interior/exterior axis. The compound fenestration unit assembly also includes a first joining strip attached to the first frame member of the first fenestration unit, the first joining strip comprising a mulling channel aligned with the mull joint axis, the mulling channel opening towards the exterior side of the first frame member; and a second joining strip attached to the second frame member of the second fenestration unit, the second joining strip comprising a mulling channel aligned with the mull joint axis, the mulling channel on the second joining strip opening towards the interior side of the second frame member such that the mulling channel on the first joining strip mechanically interlocks with the mulling channel on the second joining strip, wherein the mechanically interlocking mulling channels prevent movement of the first frame member away from the second frame member along the separation axis, prevent movement of the first frame member towards the exterior side of the second frame member along the interior/exterior axis, and prevent movement of the second frame member towards the interior side of the first frame member along the interior/exterior axis. The first frame member comprises a pair of frame channels, wherein the pair of frame channels comprises a first frame channel and a second frame channel, wherein the first frame channel opens towards the exterior side of the first frame member and the second frame channel opens towards the interior side of the first frame member. The first joining strip comprises a retaining channel facing the first frame member of the first fenestration unit, wherein the retaining channel mechanically interlocks with one of the first frame channel and the second frame channel, wherein the mechanically interlocking retaining channel and one of the first frame channel and the second frame channel prevent movement of the first joining strip away from the first frame member along the separation axis and also prevent movement of the first joining strip relative to the first frame member in at least one direction along the interior/exterior axis. The second frame member comprises a second pair of frame channels, wherein the second pair of frame channels on the second frame member comprises a first frame channel and a second frame channel, wherein the first frame channel on the second frame member opens towards the exterior side of the second frame member and the second frame channel opens towards the interior side of the second frame member. The second joining strip comprises a retaining channel facing the second frame member of the first fenestration unit, wherein the retaining channel on the second joining strip mechanically interlocks with one of the first frame channel and the second frame channel on the second frame member, wherein the mechanically interlocking retaining channel on the second joining strip and one of the first frame channel and the second frame channel on the second frame member prevent movement of the second joining strip away from the second frame member along the separation axis and also prevent movement of the second joining strip relative to the second frame member in at least one direction along the interior/exterior axis.

In one or more embodiments of a compound fenestration assembly according to the third aspect, the first frame channel on the first frame member and the second frame channel on the first frame member extend along the first frame member from the first end to the second end of the mull joint. In one or more embodiments, the retaining channel on the first joining strip extends along the first joining strip from the first end to the second end of the mull joint.

In one or more embodiments of a compound fenestration assembly according to the third aspect, the first frame channel on the second frame member and the second frame channel on the second frame member extend along the second frame member from the first end to the second end of the mull joint. In one or more embodiments, the first frame channel on the first frame member and the second frame channel on the first frame member extend along the first frame member from the first end to the second end of the mull joint.

In one or more embodiments of a compound fenestration assembly according to the third aspect, the retaining channel on the first joining strip is offset from the retaining channel on the second joining strip along the interior/exterior axis.

In one or more embodiments of a compound fenestration assembly according to the third aspect, the mull joint comprises a mull joint connector cavity located between the first joining strip and the second joining strip.

In one or more embodiments of a compound fenestration assembly according to the third aspect, the first joining strip comprises a web extending from an interior edge proximate the interior side of the first frame member to an exterior edge proximate the exterior side of the first frame member, wherein the web comprises a reinforcing rib extending towards the first frame member. In one or more embodiments, the reinforcing rib comprises a first reinforcing rib, wherein the web of the first joining strip comprises a second reinforcing rib extending towards the extending towards the first frame member, wherein the retaining channel on the first joining strip is located between the first reinforcing rib and the second reinforcing rib.

In one or more embodiments of a compound fenestration assembly according to the third aspect, the second joining strip comprises a web extending from an interior edge proximate the interior side of the second frame member to an exterior edge proximate the exterior side of the second frame member, wherein the web of the second joining strip comprises a reinforcing rib extending towards the second frame member.

In a fourth aspect, one or more embodiments of a compound fenestration assembly as described herein includes: a first frame member of a first fenestration unit attached to a second frame member of a second fenestration unit along a mull joint having a first end and a second end, wherein the mull joint defines a mull joint axis extending along a length of the mull joint between the first and second ends of the mull joint, wherein the first and second frame members comprise exterior sides facing in the same direction and interior sides facing in an opposite direction from the exterior sides, wherein an interior/exterior axis extends between the interior and exterior sides of the first and second frame members in a direction transverse to the mull joint axis, wherein the first frame member faces the second frame member across the mull joint, wherein a separation axis extends through the mull joint between the first and second frame members, the separation axis extending in a direction transverse to both the mull joint axis and the interior/exterior axis. The compound fenestration unit assembly further includes a first joining strip attached to the first frame member of the first fenestration unit, the first joining strip comprising a mulling channel aligned with the mull joint axis, the mulling channel opening towards the exterior side of the first frame member; and a second joining strip attached to the second frame member of the second fenestration unit, the second joining strip comprising a mulling channel aligned with the mull joint axis, the mulling channel opening towards the interior side of the second frame member such that the mulling channel on the first joining strip mechanically interlocks with the mulling channel on the second joining strip, wherein the mechanically interlocking mulling channels prevent movement of the first frame member away from the second frame member along the separation axis, prevent movement of the first frame member towards the exterior side of the second frame member along the interior/exterior axis, and prevent movement of the second frame member towards the interior side of the first frame member along the interior/exterior axis. The first joining strip comprises an exterior flange located along an exterior edge of the first joining strip and an interior flange located along an interior edge of the first joining strip, wherein the exterior flange and the interior flange both extend away from the mull joint to a free edge in a direction aligned with the separation axis such that a portion of the first frame member of the first fenestration unit is located between the exterior flange and the interior flange of the first joining strip.

In one or more embodiments of a compound fenestration assembly according to the fourth aspect, both the exterior flange and the interior flange extend along the first joining strip from the first end to the second end of the mull joint.

In one or more embodiments of a compound fenestration assembly according to the fourth aspect, the first frame member and the first joining strip comprise an interference fit between the exterior flange and the interior flange.

In one or more embodiments of a compound fenestration assembly according to the fourth aspect, a width of the exterior flange measured along the separation axis is uniform over substantially an entire length of the first joining strip from the first end to the second end of the first joining strip and wherein a width of the interior flange measured along the separation axis is uniform over substantially the entire length of the first joining strip. In one or more embodiments, the width of the exterior flange is the same as the width of the interior flange.

In one or more embodiments of a compound fenestration assembly according to the fourth aspect, the mull joint comprises a mull joint connector cavity located between the first joining strip and the second joining strip.

In one or more embodiments of a compound fenestration assembly according to the fourth aspect, the compound fenestration assembly comprises an exterior mull joint width and an exterior flange width, wherein the exterior mull joint width is measured along the separation axis between the first frame member of the first fenestration unit and the second frame member of the second frame member at the exterior side of the first frame member, wherein the exterior flange width is measured along the separation axis from the free edge of the exterior flange of the first joining strip to the free edge of the exterior flange of the second joining strip, and wherein the exterior flange width is 2 or more times the exterior mull joint width. In one or more embodiments, the exterior flange width is 3 or more times the exterior mull joint width.

In one or more embodiments of a compound fenestration assembly according to the fourth aspect, the compound fenestration assembly comprises an interior mull joint width and an interior flange width, wherein the interior mull joint width is measured along the separation axis between the first frame member of the first fenestration unit and the second frame member of the second frame member at the interior side of the first frame member, wherein the interior flange width is measured along the separation axis from the free edge of the interior flange of the first joining strip to the free edge of the interior flange of the second joining strip, and wherein the interior flange width is 2 or more times the interior mull joint width. In one or more embodiments, the interior flange width is 3 or more times the interior mull joint width. In one or more embodiments, the interior flange width is equal to the exterior flange width.

In a fifth aspect, one or more embodiments a method of connecting a first fenestration unit to a second fenestration unit using a mull joint (wherein the mull joint defines a mull joint axis extending along a length of the mull joint between the first and second fenestration units, a separation axis extending across the mull joint between the first and second fenestration units perpendicular to the mull joint axis, and an interior/exterior axis extending through the mull joint between the first and second fenestration units, the interior/exterior axis perpendicular to both the mull joint axis and the separation axis) includes: attaching a first joining strip to a first frame member of the first fenestration unit, the first joining strip comprising a mulling channel aligned with the mull joint axis, the mulling channel opening towards an exterior side of the first frame member, and wherein attaching the first frame member comprises forming a mechanical interlock between a frame channel on the first frame member and a retaining channel on the first joining strip, wherein the mechanically interlocking retaining channel and the frame channel prevent movement of the first joining strip away from the first frame member along the separation axis and also prevent movement of the first joining strip relative to the first frame member in at least one direction along the interior/exterior axis; attaching a second joining strip to a second frame member of the second fenestration unit, the second joining strip comprises a mulling channel aligned with the mull joint axis, the mulling channel opening towards an interior side of the second frame member, and wherein attaching the second frame member comprises forming a mechanical interlock between a frame channel on the second frame member and a retaining channel on the second joining strip, wherein the mechanically interlocking retaining channel on the second joining strip and the frame channel on the second frame member prevent movement of the second joining strip away from the second frame member along the separation axis and also prevent movement of the second joining strip relative to the second frame member in at least one direction along the interior/exterior axis; and attaching the first fenestration unit to the second fenestration unit by forming a mechanical interlock between the mulling channel on the first joining strip and the mulling channel on the second joining strip after attaching the first joining strip to the first frame member and after attaching the second joining strip to the second frame member, wherein the mechanically interlocking mulling channels prevent movement of the first frame member away from the second frame member along the separation axis, prevent movement of the first frame member towards the exterior side of the second frame member along the interior/exterior axis, and prevent movement of the second frame member towards the interior side of the first frame member along the interior/exterior axis.

In a method according to the fifth aspect, the first joining strip comprises a pair of retaining channels facing the first frame member of the first fenestration unit and only one frame channel on the first frame member, wherein only one retaining channel of the pair of retaining channels is mechanically interlocked with the only one frame channel. In one or more embodiments, the second joining strip comprises a pair of retaining channels facing the second frame member of the second fenestration unit and only one frame channel on the second frame member, wherein only one retaining channel of the pair of retaining channels on the second joining strip is mechanically interlocked with the only one frame channel on the second frame member. In one or more embodiments, the mechanically interlocking only one retaining channel on the first joining strip and only one frame channel on the first frame member are aligned with the mechanically interlocking only one retaining channel on the second joining strip and only one frame channel on the second frame member along the separation axis.

In a method according to the fifth aspect, the first joining strip comprises only one retaining channel facing the first frame member of the first fenestration unit and a pair of frame channels on the first frame member, wherein only one frame channel of the pair of frame channels is mechanically interlocked with the only one retaining channel. In one or more embodiments, the second joining strip comprises only one retaining channel facing the second frame member of the second fenestration unit and a pair of frame channels on the second frame member, wherein only one frame channel of the pair of frame channels on the second frame member is mechanically interlocked with the only one retaining channel on the second joining strip. In one or more embodiments, the mechanically interlocking only one frame channel on the first frame member and only one retaining channel on the first joining strip are offset from the mechanically interlocking only one frame channel on the second frame member and only one retaining channel on the second joining strip along the separation axis.

As used herein and in the appended claims, the singular forms “a,” “an,” and “the” include plural referents unless the context clearly dictates otherwise. Thus, for example, reference to “a” or “the” component may include one or more of the components and equivalents thereof known to those skilled in the art. Further, the term “and/or” means one or all of the listed elements or a combination of any two or more of the listed elements.

It is noted that the term “comprises” and variations thereof do not have a limiting meaning where these terms appear in the accompanying description. Moreover, “a,” “an,” “the,” “at least one,” and “one or more” are used interchangeably herein.

The above summary is not intended to describe each embodiment or every implementation of the compound fenestration assembly mull joints and methods of making and using the same as described herein. Rather, a more complete understanding of the invention will become apparent and appreciated by reference to the following Description of Illustrative Embodiments and claims in view of the accompanying figures of the drawing.

DESCRIPTION OF ILLUSTRATIVE EMBODIMENTS

Figure 1:
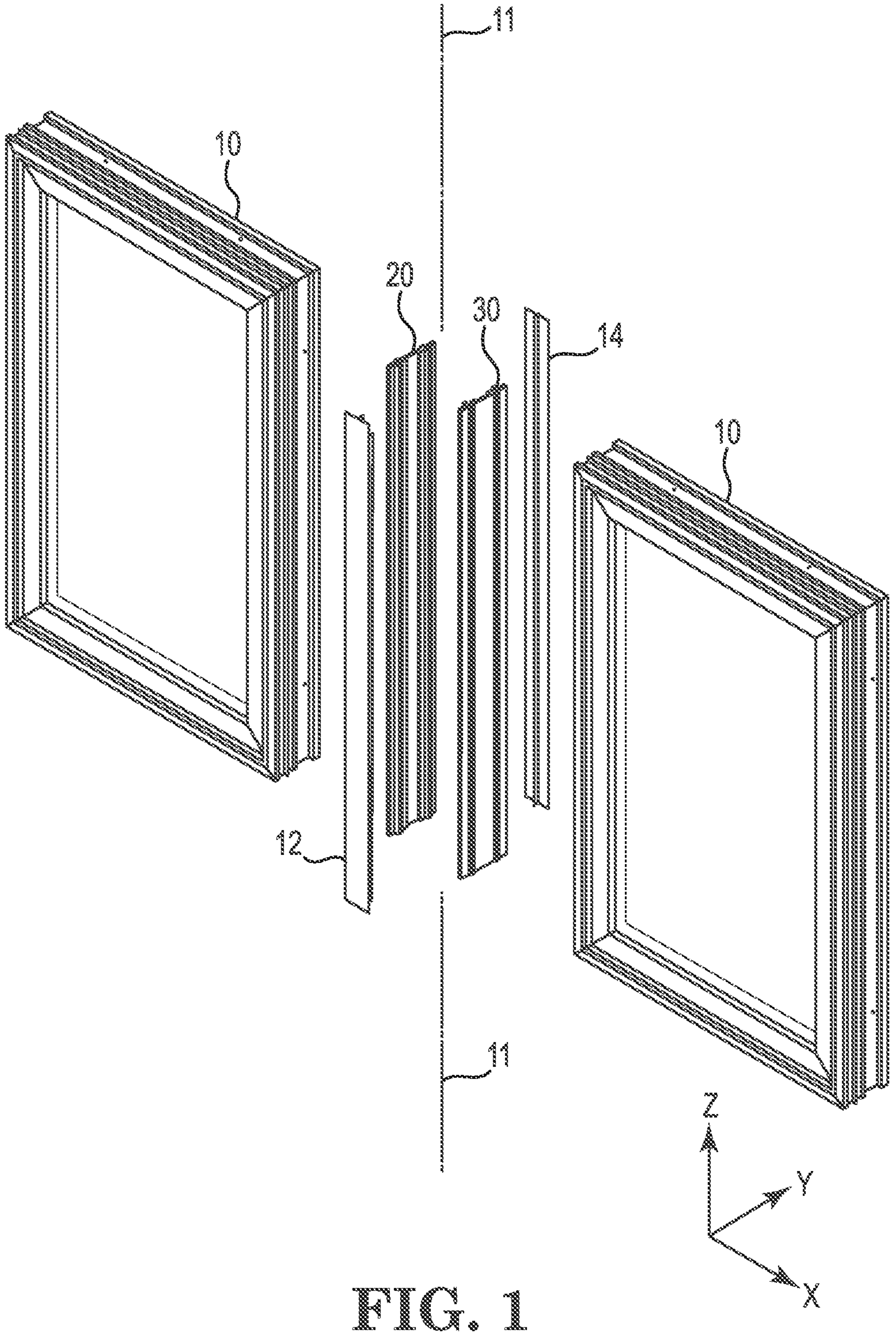
FIG. 1 is an exploded view of one illustrative embodiment of a compound fenestration assembly including a mull joint having joining strips as described herein.

In the following description of illustrative embodiments, reference is made to the accompanying figures of the drawing which form a part hereof, and in which are shown, by way of illustration, specific embodiments. It is to be understood that other embodiments may be utilized and structural changes may be made without departing from the scope of the present invention.

One illustrative embodiment of a compound fenestration assembly including illustrative embodiments of the joining strips as described herein is depicted in an exploded assembly diagram in FIG. 1. The compound fenestration assembly depicted in FIG. 1 includes a pair of fenestration units 10.

The fenestration units 10 are joined using joining strips 20 and 30 that, in the depicted embodiment, would be attached to each of the fenestration units 10. More specifically, in the depicted embodiment, joining strip 20 would be attached to the left side fenestration unit 10 while joining strip 30 would be attached to the right side fenestration unit 10 to form a mull joint between fenestration units 10 defining and extending along a mull joint axis 11 as depicted in FIG. 1. Also depicted in FIG. 1 are trim strips 12 and 14. The trim strips 12 and 14 can help to provide a more finished appearance as well as protect the mull joint from infiltration by precipitation, air, insects, etc.

Figure 2:
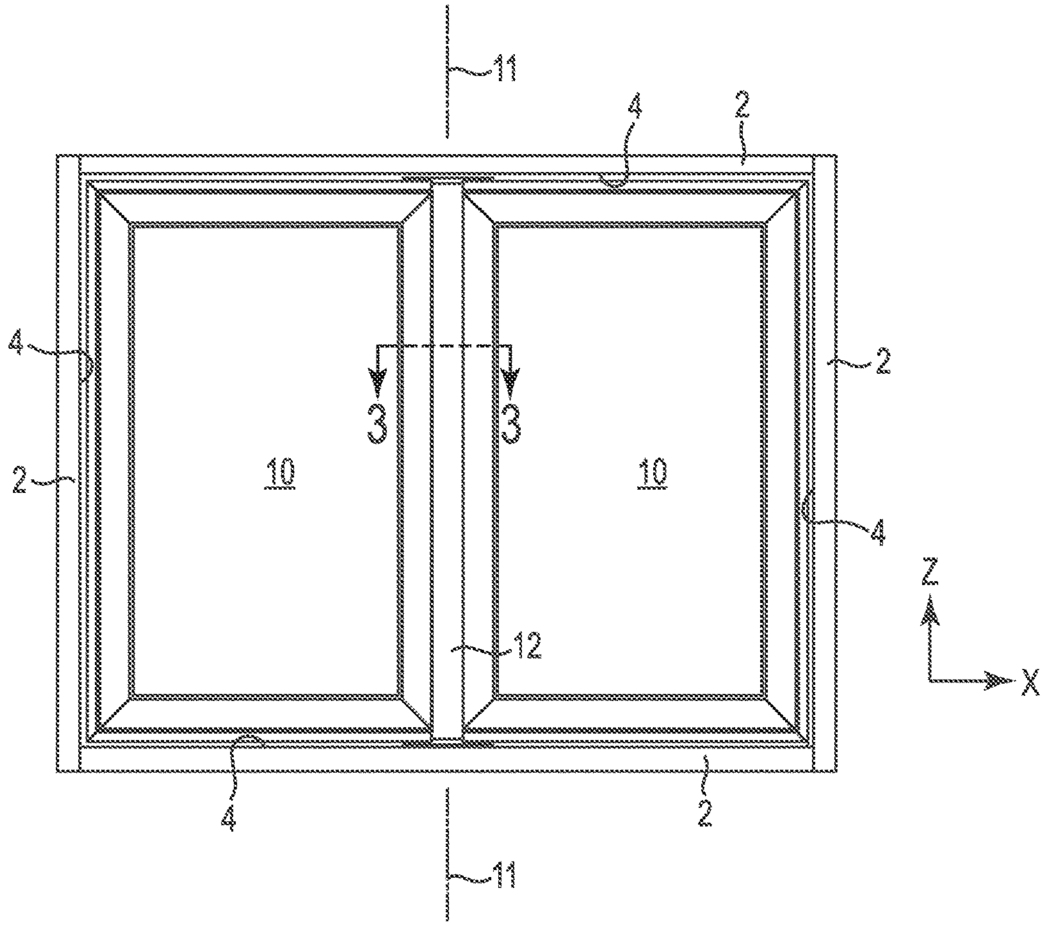
FIG. 2 is a front elevational view of the compound fenestration assembly of FIG. 1 as assembled.

The compound fenestration assembly of FIG. 1 is depicted after assembly and positioning in a building opening. The building opening is defined by framing members 2, with the framing members 2 having opening surfaces 4 that face the fenestration units 10 and the mull joint located therebetween. As described in connection with FIG. 1, the mull joint defines and extends along a mull joint axis 11 between fenestration units 10 (with mull joint axis 11 also depicted in FIG. 1). In the depicted embodiments, the mull joint axis 11 corresponds to the Z-axis of the Cartesian coordinate systems depicted in the figures. In the view of FIG. 2, the trim strip 12 blocks the joining strips 20 and 30 from view.

Figure 3:
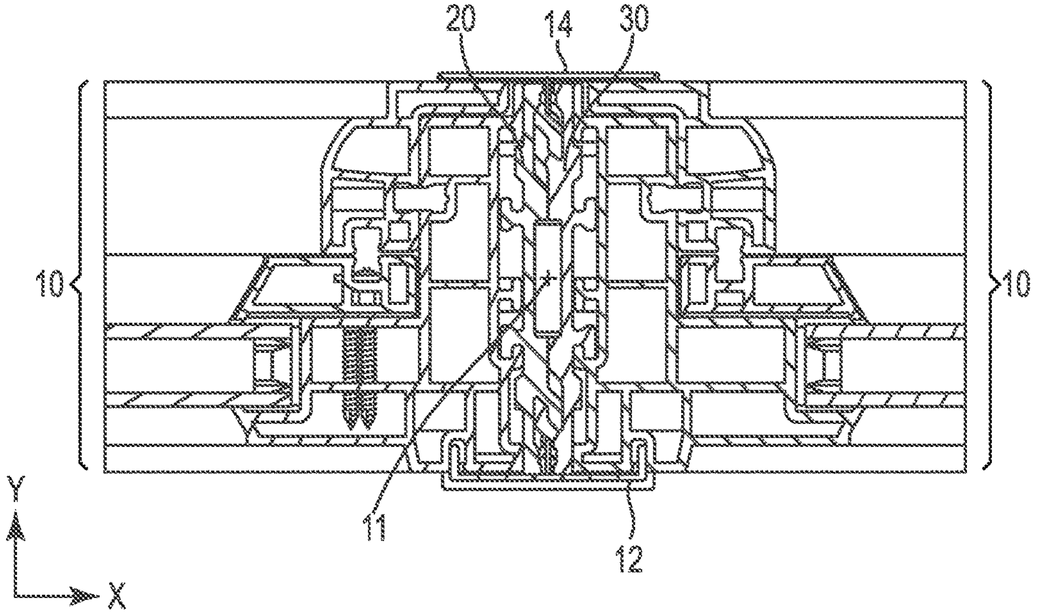
FIG. 3 is a cross-sectional view of the compound fenestration assembly of FIG. 2 taken along line 3-3 in FIG. 2.

The mull joint formed between the fenestration units 10 is depicted in a cross-sectional view in FIG. 3 in which joining strip 20 is attached to one frame member of the left side fenestration unit 10 while joining strip 30 is attached to the frame member of the right side fenestration unit 10. Trim strips 12 and 14 are located on opposite sides of the frame members of the left and right side fenestration units 10. One of the trim strips 12 may be described as being located along the exterior side of the mull joint and fenestration units 10 while the opposite trim strip 14 may be described as being located along the interior side of the mull joint and fenestration units 10. In alternative embodiments, the interior and exterior sides of the mull joint and fenestration units 10 may be switched.

The terms "interior" and "exterior" are used herein only to designate opposite sides of the compound fenestration assemblies described herein and are not to be construed as limiting the invention in any manner. In other words, a compound fenestration assembly as described herein, when installed in a building opening, may be installed with its interior and exterior sides facing in the conventional directions or, alternatively, installed with its interior side exposed on the exterior of a building and the exterior side facing the interior of the building.

Figure 4:
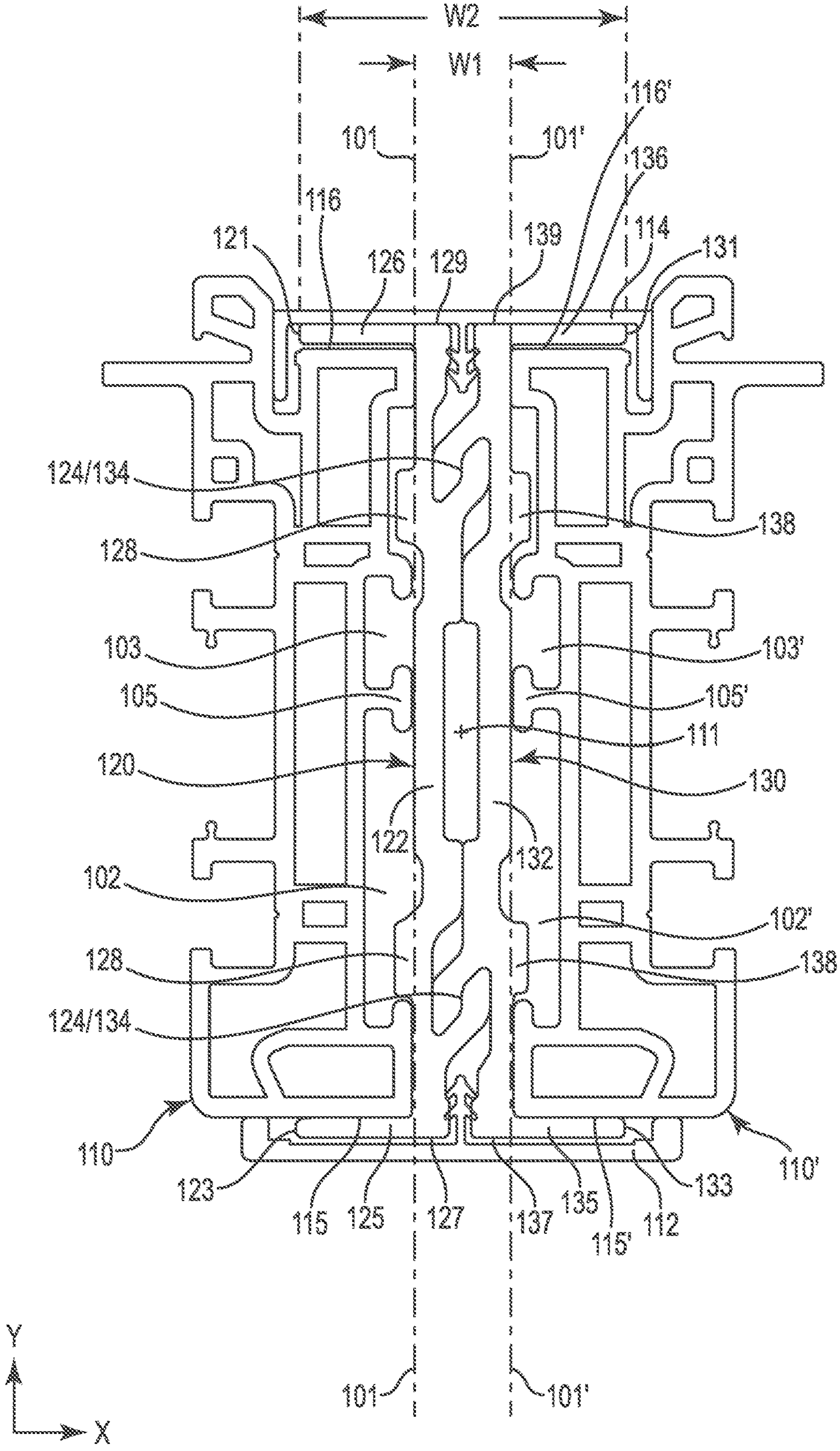
FIG. 4 is an end view (taken along the mull joint axis/Z-axis) of another illustrative embodiment of a compound fenestration assembly depicting the frame members of a pair of adjacent fenestration units and a pair of flanged joining strips used to form a mull joint between the frame members as described herein.

One illustrative embodiment of a mull joint in one embodiment of a compound fenestration assembly including flanged joining strips as described herein is depicted in FIGS. 4-7. In particular, FIG. 4 is an end view of the frame members of a pair of adjacent fenestration units 110 and 110' (with other components such as sash channels, sash frames, glazing, etc. removed) and a pair of flanged joining strips 120 and 130 forming a mull joint between the frame members of the fenestration units 110 and 110'. The end view of FIG. 4 is taken along the mull joint axis 111 corresponding to the Z-axis of the Cartesian coordinate system depicted in FIG. 4.

In the depicted embodiment, joining strip 120 is attached to the frame member of the left side fenestration unit 110 and includes a pair of mulling channels 124, while joining strip 130 attached to the frame member of the right side fenestration unit 110' includes a pair of complementary channels 134. Mulling channels 124 of joining strip 120 may be described as opening towards the exterior side of the fenestration units 110 and 110' while channels 134 of joining strip 130 may be described as opening towards the interior side of the fenestration units 110 and 110'. As such, the joining strips 120 and 130 are oriented such that the mulling channels 124 and 134 nest with each other.

As a result, a secure connection between the joining strips 120 and 130 is obtained through the nested channel structures 124/134 in the opposing joining strips 120 and 130, with the nested joining strips resisting movement of the fenestration units relative to each other. For example, the mull joints and compound fenestration assemblies in which mull joints are found may be described as defining an interior/exterior axis that extends between the interior and exterior sides of the mull joint. In the depicted illustrative embodiment as seen in FIG. 4, the interior/exterior axis corresponds to the Y-axis of the depicted Cartesian coordinate system.

Also with reference to FIG. 4, the frame member of the left side fenestration unit 110 may be described as facing the frame member of the right side fenestration unit 110' across the mull joint, with a separation axis extending through the mull joint between the left and right side fenestration units 110 and 110'. In the depicted illustrative embodiment as seen in FIG. 4, the separation axis corresponds to the X-axis of the depicted Cartesian coordinate system.

The interior/exterior axis, separation axis, and mull joint axis are all, in one or more embodiments, perpendicular to each other. These relationships can be seen in many of the figures used to describe the illustrative embodiments of the compound fenestration assemblies and mull joints herein. As noted above, the interior/exterior axis corresponds to the Y-axis, the separation axis corresponds to the X-axis, and the mull joint axis (111 in FIG. 4) corresponds to the Z axis of the Cartesian coordinate systems as depicted in the figures.

In connection with the illustrative embodiment depicted in FIG. 4, the nested mulling channels 124/134 of the joining strips 120 and 130 may be described as preventing movement of the left and right side fenestration members 110 away from each other along the separation axis (i.e., the X-axis while also preventing movement of the left side fenestration unit 110 along the interior/exterior axis towards the exterior sides of the fenestration units 110 (on which trim strip 112 is located) and preventing movement of the right side fenestration unit 110 along the interior/exterior axis towards the interior sides of the fenestration units 110 (on which trim strip 114 is located).

Although the depicted embodiment of joining strips 120 and 130 include pairs of nested mulling channels 124 and 134, the function of the joining strips in preventing movement of the fenestration units relative to each other along both the interior/exterior axis and the separation axis may be accomplished using only one pair of nested channels, with, for example, joining strip 120 including only one of nested mulling channels 124 and joining strip 130 including only one of nested channels 134, with the single pair of nested mulling channels 124/134 on joining strips 120 and 130 performing those functions.

Joining strips having nested channels facing each other across a mull joint such as those provided in the compound fenestration assembly depicted in FIGS. 1-4 along with other mull joint features that may be used in the compound fenestration assemblies described herein may be described more completely in, for example, U.S. Pat. Nos. 10,626,664 & 10,968,687 (both to Kelley et al.).

The illustrative embodiment of joining strips 120 and 130 used in the mull joint depicted in FIG. 4 include interior and exterior flanges connected to a web spanning the mull joint between the exterior sides and the interior sides of the frame members of the fenestration units 110.

The illustrative embodiment of joining strip 120 includes a web 122 spanning the mull joint and extending from an interior edge 127 to an exterior edge 129, with an interior flange 125 extending away from the mull joint and the interior edge 127 of the joining strip 120 in a direction aligned with the separation axis (in the depicted Cartesian coordinate system, the X-axis). The interior flange 125 extends away from the mull joint and the interior edge 127 of web 122 to a free edge 123 located distal from the mull joint. Joining strip 120 also includes an exterior flange 126 attached to the web 122 spanning the mull joint, the exterior flange 126 extending away from the exterior edge 129 of the web 122 (and the mull joint) in a direction aligned with the separation axis, the exterior flange 126 extending away from the exterior edge 129 of the web 122 (and the mull joint) to a free edge 121 located distal from the mull joint. As a result, a portion of the frame member of the left side fenestration unit 110 is located between the interior flange 125 and the exterior flange 126 of joining strip 120.

In one or more embodiments, the flanges 125/126 are spaced apart along the interior/exterior axis by the web 122 such that the joining strip 120 has an interference fit with the frame member of the fenestration unit 110 between the interior flange 125 and the exterior flange 126. In other words, the joining strip 120 may be retained, in view of that interference fit, on the frame member of fenestration unit 110 by friction between the flanges 125/126 and the interior and exterior sides of the frame member of the fenestration unit 110. In one or more alternative embodiments, joining strips including flanges could be retained on the frame members of fenestration units using one or more techniques in addition to or in place of a friction fit, e.g., mechanical fasteners, adhesives, thermal welding, chemical welding, etc.

The illustrative embodiment of joining strip 130 on the opposite side of the mull joint includes an interior flange 135 extending away from the mull joint in a direction aligned with the separation axis, the interior flange 135 attached to the web 132 spanning the mull joint, the interior flange 135 extending away from the interior edge 137 of the web 132 and the mull joint to a free edge 133 located distal from the mull joint. Joining strip 130 also includes an exterior flange 136 extending away from the exterior edge 139 of the web 132 and the mull joint in a direction aligned with the separation axis, the exterior flange 136 also extending away from the mull joint to a free edge 131 located distal from the mull joint. As a result, a portion of the frame member of the right side fenestration unit 110 is located between the interior flange 135 and the exterior flange 136 of joining strip 130.

In one or more embodiments, the joining strip 130 includes a web 132 along with flanges 135/136 that are spaced such that the joining strip 130 has an interference fit with the frame member of the fenestration unit 110 located between the interior flange 135 and the exterior flange 136. In other words, the joining strip 130 may be retained, in view of that interference fit, on the frame member of the right side fenestration unit 110 by friction between the flanges 125/126 and the interior and exterior sides of the frame member of the right side fenestration unit 110.

As discussed herein, the joining strips used in the compound fenestration assembly mull joints described herein are configured to improve the strength of the mull joints in which they are used. Although increased strength in the mull joints is desirable, increase strength could be achieved by providing mull joints that are thicker (as measured along the separation axis) but it is also desirable to provide a mull joint that is as narrow as possible to improve the overall appearance of a compound fenestration assembly, reduce weight, reduce costs, etc.

In the case of flanged joining strips such as, e.g., joining strips 120 and 130, increased strength may be achieved using the flanges on the joining strips while providing an opportunity to limit the width of the mull joint constructed using those joining strips. In particular, the flanges provide a structure that has an increased width as measured along the separation axis (i.e., the X-axis), with that increased width improving the bending strength of the joining strip by increasing the moment of inertia of the flanged joining strips.

Mull planes 101 and 101' defined by the frame members of fenestration units 110 and 110' are depicted in FIG. 4 and can be useful when discussing the relationship between the joining strips 120/130 and their respective frame members of fenestration units 110/110'. In particular, left side frame member of fenestration unit 110 can be described as having a mull surface facing the right side frame member of fenestration unit 110' across the mull joint and the right side frame member of fenestration unit 110' can be described as having a mull surface facing the frame member of fenestration unit 110 across the mull joint. The mull surface of the frame member of fenestration unit 110 defines mull plane 101 which extends between the interior side 115 and the exterior side 116 of the frame member of fenestration unit 110 (and also along a length of the frame member of fenestration unit 110 from the first end to the second end of the mull joint, i.e., into and/or out of the page along the mull joint axis 111). The mull surface of the frame member of fenestration unit 110' defines mull plane 101' which extends between the interior side 115' and the exterior side 116' of the frame member of fenestration unit 110' (and also along a length of the frame member of fenestration unit 110' from the first end to the second end of the mull joint, i.e., into and/or out of the page along the mull joint axis 111). In particular, the mull planes 101/101' are defined by the junctions between the mull surfaces of the frame members of fenestration units 110/110' at their respective interior and exterior sides 115, 116, 115', 116'. In terms of the Cartesian coordinate system provided in the figures, the mull planes 101 and 101' can be described as Y-Z planes extending across the frame members of fenestration units 110 and 110'.

One manner in which the balance and relationship between mull joint strength and mull joint width can be characterized is by comparing the mull joint width to the flange width on one or both of the interior and exterior sides of the mull joint use to connect adjacent fenestration units in a compound fenestration assembly as described herein. Mull joint width can be measured along the separation axis (i.e., the X-axis in the depicted Cartesian coordinate system) between the mull planes extending between the interior and exterior sides of the of the frame members on the interior and exterior sides of the frame members. In the illustrative embodiment depicted in FIG. 4, the mull joint width W1 is measured between mull plane 101 defined by the frame member of the left side fenestration unit 110 and mull plane 101' defined by the frame member of the right side fenestration unit 110'.

Flange width can be measured along the separation axis between the free edges of the flanges on the interior or exterior side of the frame members. In the illustrative embodiment depicted in FIG. 4, the flange width (in particular, the exterior flange width) W2 is measured from the free edge 121 of the exterior flange 126 of the joining strip 120 to the free edge 131 of the exterior flange 136 of the joining strip 130. To provide a suitable balance between mull joint width and flange width, in one or more embodiments, the flange width W2 may be 2 or more times the mull joint width W1. In one or more embodiments, the flange width W2 may be 3 or more times the mull joint width W1. In one or more embodiments, the mull joint width W1 may be within a range of about 0.25 inch to about 1 inch (e.g., about 0.5 inch) and the flange width W2 may be within a range of about 0.5 inch to about 3 inches (e.g., about 1.7 inches).

Although mull joint width and flange width are described above in connection with the exterior side of the compound fenestration assembly depicted in FIG. 4, it will be understood that the same relationships may be provided on the interior sides of the compound fenestration assemblies described herein. In one or more embodiments, the interior flange width may be equal to the exterior flange width, although such a relationship is not required in all embodiments of the compound fenestration assemblies described herein. In some embodiments, a flange may be provided on only one side of a joining strip (e.g., only along one of the interior edge 127 or the exterior edge 122 of web 122) used in a mull joint of a compound fenestration assembly as described herein.

Figure 5:
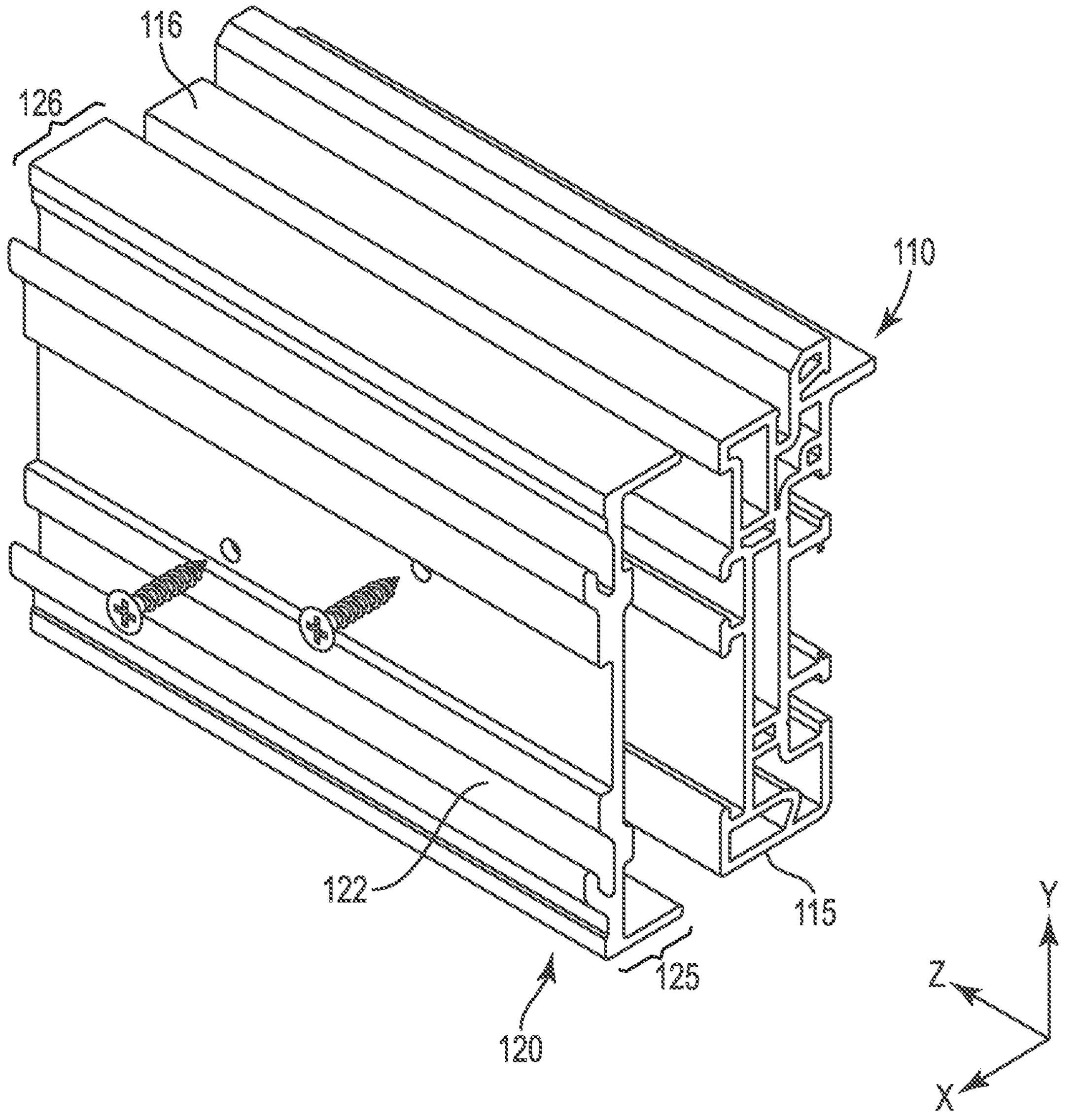
FIG. 5 is an exploded perspective view of the joining strip and frame member on one side of the mull joint of FIG. 4.
Figure 6:
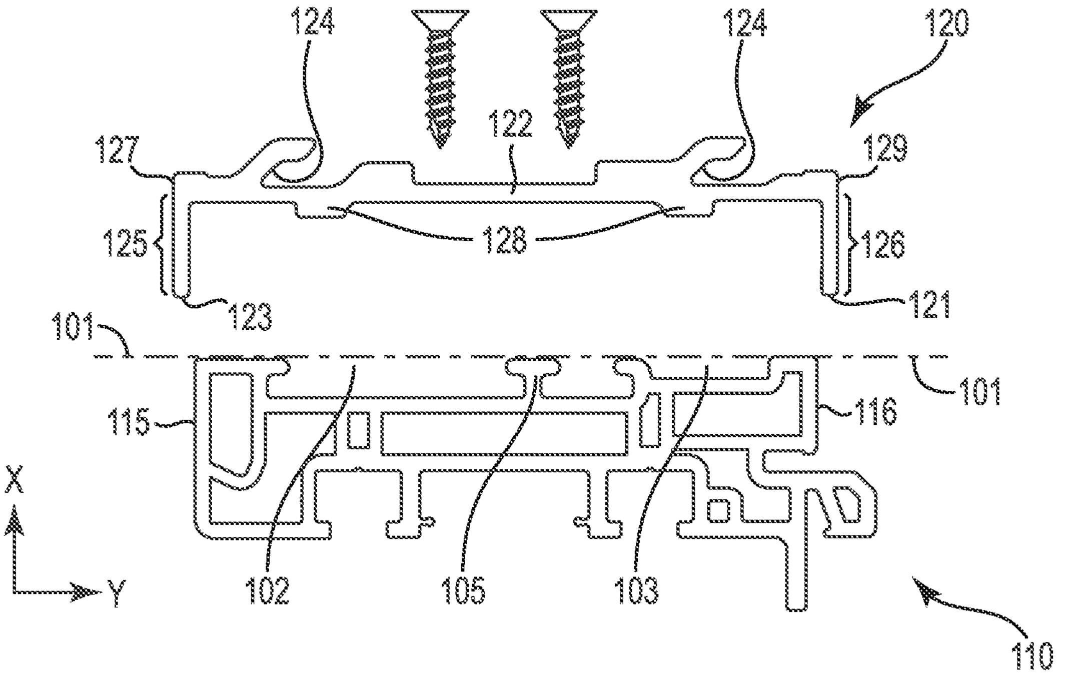
FIG. 6 is an end view of FIG. 5 taken along the Z-axis in FIG. 5.
Figure 7:
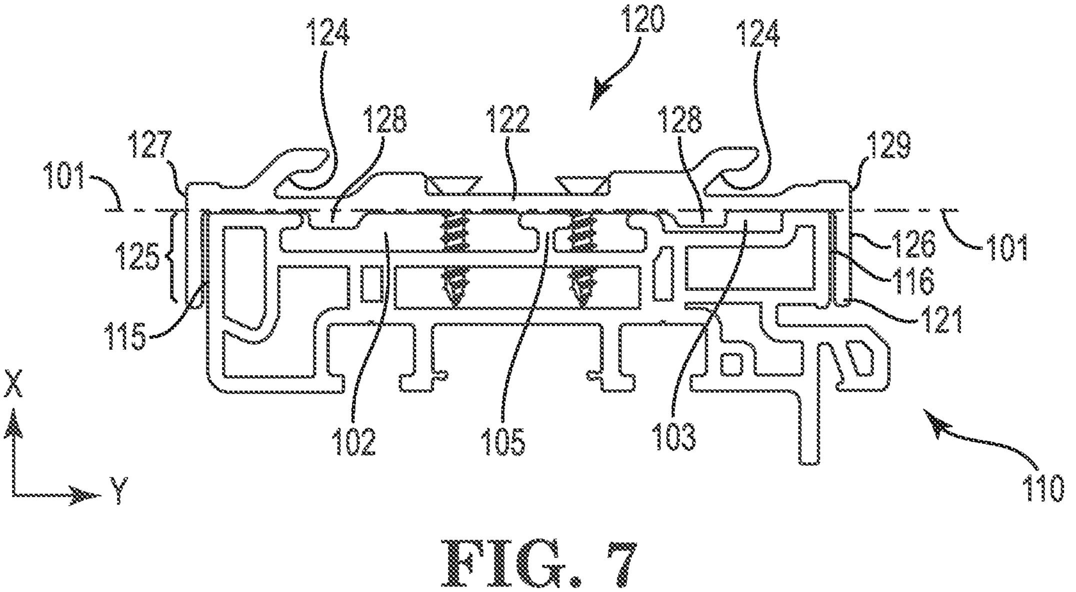
FIG. 7 is an end view of the components of FIG. 6 taken along the Z-axis after attachment of the joining strip to the frame member.

FIGS. 5-7 depict the assembly of a joining strip such as, e.g., joining strip 120 on the frame member of a fenestration unit 110. The joining strip 120 is positioned on the frame member of fenestration unit 110 with the interior flange 125 located proximate the exterior surface 115 of the frame member of fenestration unit 110 and the exterior flange 126 located proximate the exterior surface 116 of the frame member of the fenestration unit 110. Web 122 spans the frame member of fenestration unit 110.

Although the interior flange 125 and exterior flange 126 may be spaced apart by the web 122 such that an interference fit is formed between flanges 125 and 126 and surfaces 115 and 116 on the frame member of fenestration unit 110, the joining strip 120 may be secured in place using one or more alternative techniques in addition to the interference fit. In the depicted illustrative embodiment, mechanical fasteners are depicted and can be used to secure the joining strip 120 on the frame member of fenestration unit 110.

The joining strip 120 and frame member of fenestration unit 110 of the mull joint of FIG. 4 are depicted in FIG. 6 before assembly and in FIG. 7 after assembly and can be used to describe the features used to provide mull joints having a narrow width and improved strength as discussed herein.

With reference to FIG. 6, the mull surface of the of the frame member of fenestration unit 110 (the mull surface being the surface of the frame member of fenestration unit 110 facing the frame member of the opposing or adjacent fenestration unit 110' in, e.g., FIG. 4) includes frame cavities 102, 103 extending into the frame member of fenestration unit 110 such that each frame cavity 102, 103 is located between mull plane 101 and the mull surface of the frame member of fenestration unit 110. As discussed in connection with FIG. 4, the mull plane 101 as defined by the frame member of fenestration unit 110 extends between the interior side 115 and the exterior side 116 of the frame member of fenestration unit 110. The mull surface of the frame member of fenestration unit 110 as depicted in FIGS. 4, 6, and 7 includes an optional intermediate support 105 in contact with the web 122 of joining strip 120 at a location between the reinforcing ribs 128 and the frame cavities 102 and 103. The intermediate support 105 may, in one or more embodiments, provide additional structural support to the web 122 of the joining strip 120.

Although the depicted embodiment of the frame member of fenestration unit 110 includes two separate and distinct frame cavities 102 and 103 separated by intermediate support 105, one or more alternative embodiments of frame members of fenestration units used in compound fenestration assemblies as described herein may include only one frame cavity (with no intermediate support) or three or more frame cavities.

Also with reference to FIG. 6, the joining strip 120 includes, as described herein, a web 122 extending from an interior edge 127 to an exterior edge 129. The joining strip 120 also includes reinforcing ribs 128 extending from the web 122 towards the mull surface of the frame member of fenestration unit 110. Although the depicted embodiment of joining strip 120 includes two reinforcing ribs 128, one or more alternative embodiments of joining strips used in compound fenestration assemblies as described herein may include only three or more reinforcing ribs.

With reference to FIG. 7 in which the joining strip 120 is placed on and attached to the frame member of fenestration unit 110, the joining strip 120 is located on frame member of fenestration unit 110 such that its interior edge 127 and exterior edge 129 abut the corners formed by the mull surface with the interior side 125 and exterior side 126 of the frame member of fenestration unit 110. In its position on frame member of fenestration unit 110, the reinforcing ribs 128 of the joining strip 120 extend into frame cavities 102 and 103 in the frame member of fenestration unit 110 such that the mull plane 101 defined by the frame member of fenestration unit 110 intersects the reinforcing ribs 128 extending into frame cavities 102 and 103. As a result, at least a portion of each reinforcing rib 128 is located between the mull plane 101 and the mull surface of the frame member of fenestration unit 110.

As described herein, the reinforcing ribs 128 on the joining strip 120 increases the strength of the joining strip 120 (by, e.g., increasing the moment of inertia of the joining strips) and the frame cavities 102 and 103 on the frame member of fenestration unit 110 provides space for the reinforcing ribs 128 without requiring more distance between the frame member of fenestration unit 110 and the opposing frame member of fenestration unit 110' (see FIG. 4). In flanged joining strips such as joining strips 120 and 130 depicted in FIGS. 4-7, the moment of inertia if the joining strips is further increased by the material located outside of the mull joint width in the flanges 125, 126, 135, 136 with further increases in join strip, and mull joint, strength.

In one or more embodiments of flanged joining strips used in mull joints as described herein, one or both of the interior and exterior flanges may extend along substantially an entire length of the joining strip, i.e., from the first end to the second end of the joining strip.

In one or more embodiments of flanged joining strips used in mull joints as described herein, one or both of the interior and exterior flanges may have a uniform width (as measured along the separation axis) when moving along the length of the joining strip, i.e., along the mull joint axis.

In one or more embodiments of flanged joining strips used in mull joints as described herein, the width of the interior flange may be the same as the width of the exterior flange (where, as described herein, the width of the flange is measured along a separation axis when the joining strip is used in a mull joint as described herein). In one or more alternative embodiments, the width of the interior and exterior flanges may be different.

In one or more embodiments of flanged joining strips used in mull joints as described herein, the flanged joining strips used on opposite sides of a mull joint to be different lengths of a common extruded member, with each of the flanged joining strips rotated to position the different flanged joining strips on opposite sides of mull joints described herein. As a result, a manufacturer need only produce a single type of flanged joining strip for use in forming both flanged joining strips on opposite sides of the flanged mull joints as described herein.

In one or more embodiments, the flanged joining strips used in mull joints of compound fenestration assemblies as described herein may be constructed of one or more materials that provide sufficient mechanical strength as well as limiting thermal conductivity to enhance the thermal performance of compound fenestration assemblies as described herein. In one or more embodiments, the flanged joining strips may be constructed of, e.g., one or more of fiberglass, polymeric materials, metals, wood, wood composites, etc. In one or more embodiments, the flanged joining strips may be constructed of materials that have lower thermal conductivity than, e.g., metals. In one or more embodiments, however, metals (or other more thermally conductive materials) may be used to construct the joining strips where, for example, a thermal break or other feature may be provided to limit thermal conductivity through the flanged joining strips between the exterior and interior sides of a compound fenestration assembly as described herein is not required and/or desired.

Figure 8:
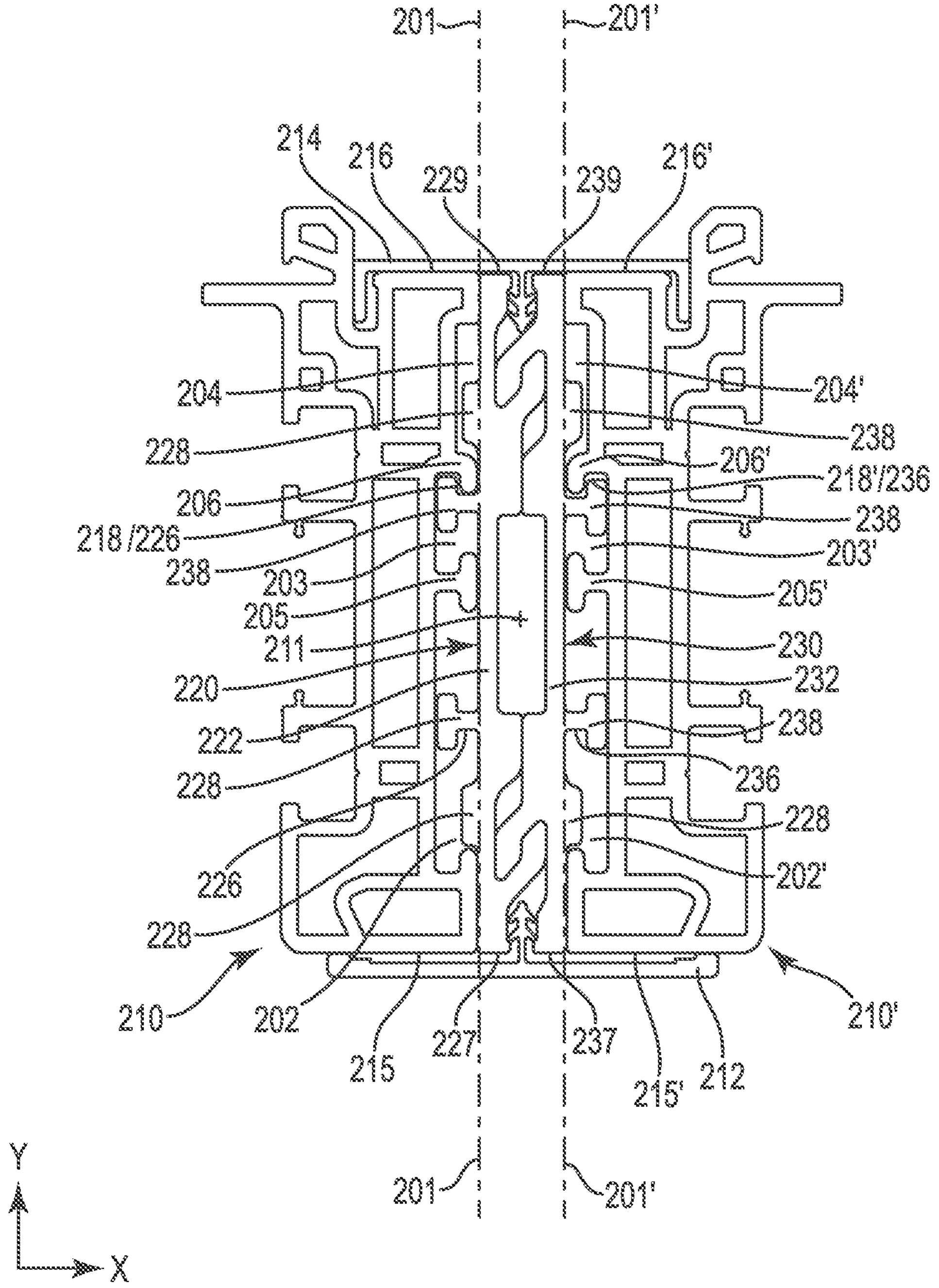
FIG. 8 is an end view (taken along the mull joint axis/Z-axis) of another illustrative embodiment of a compound fenestration assembly depicting the frame members of a pair of adjacent fenestration units and a pair of joining strips used to form a mull joint between the frame members as described herein.
Figure 9:
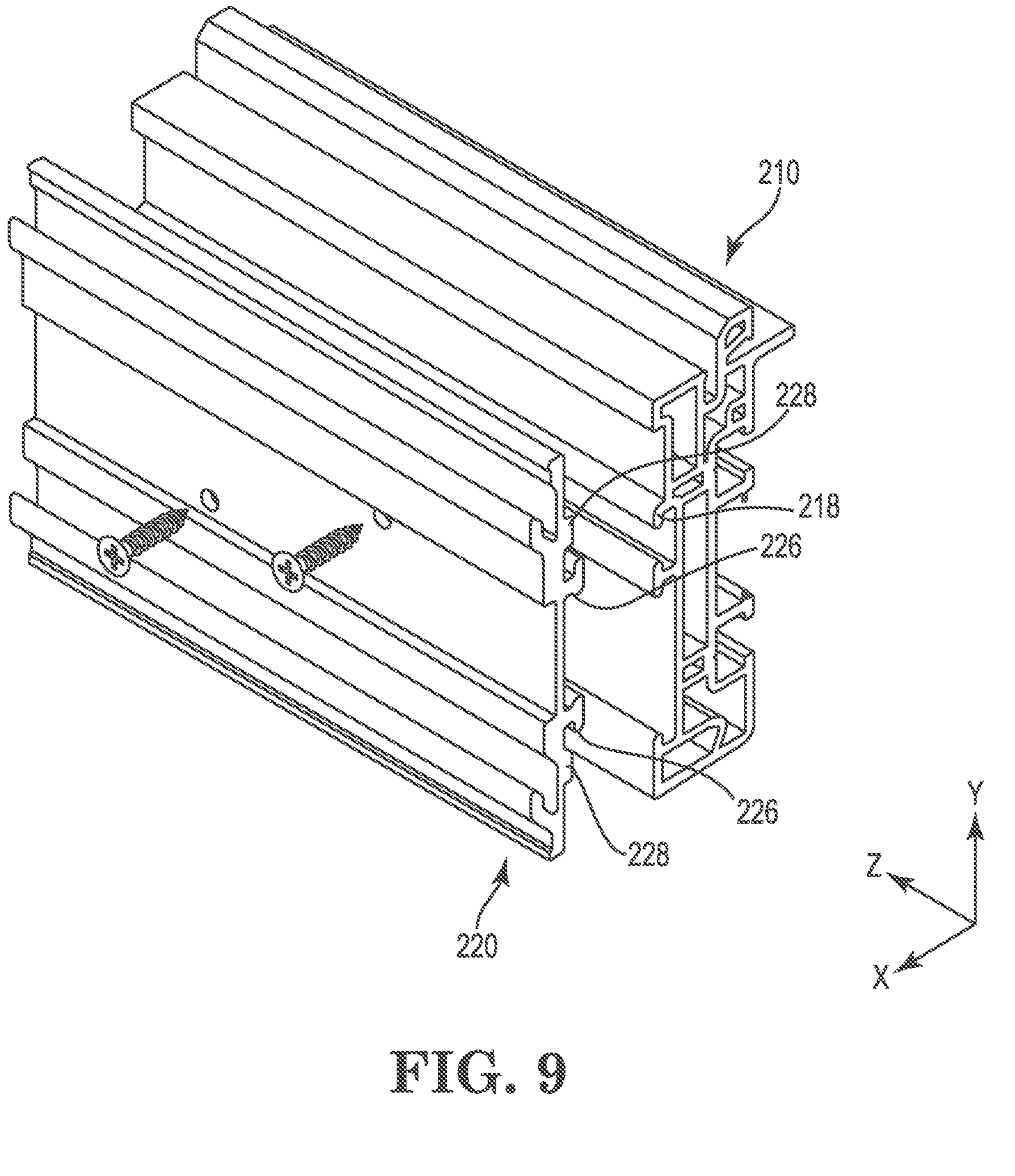
FIG. 9 is an exploded perspective view of the joining strip and frame member on one side of the mull joint of FIG. 8.
Figure 10:
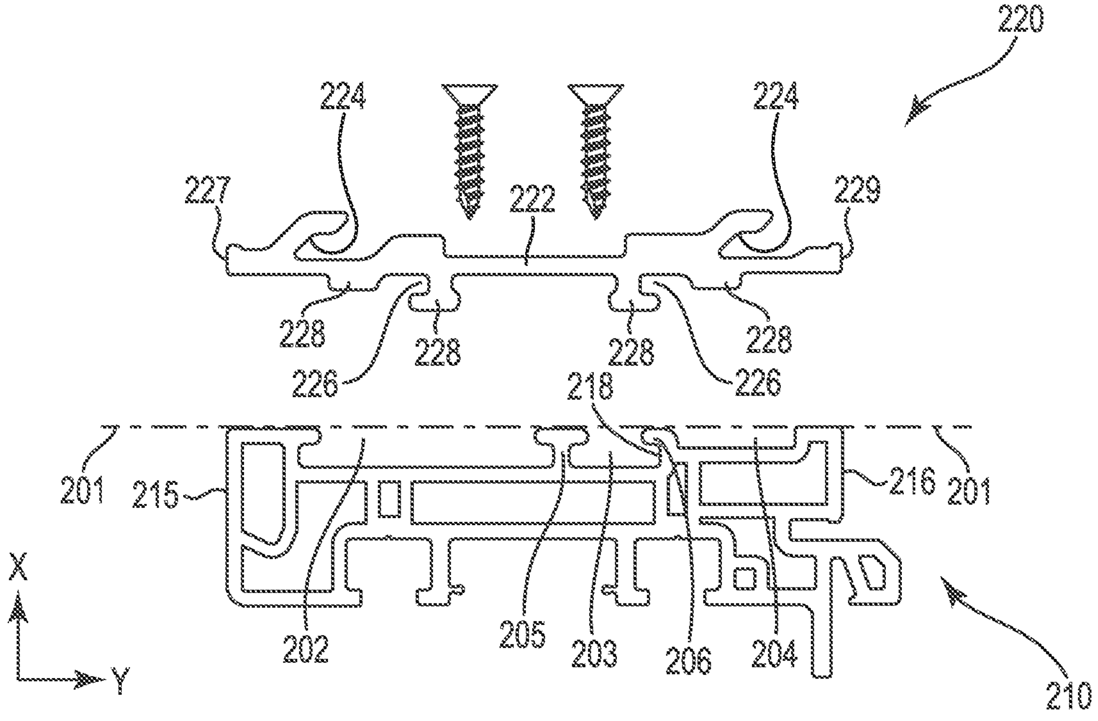
FIG. 10 is an end view of FIG. 9 taken along the Z-axis in FIG. 9.
Figure 11:
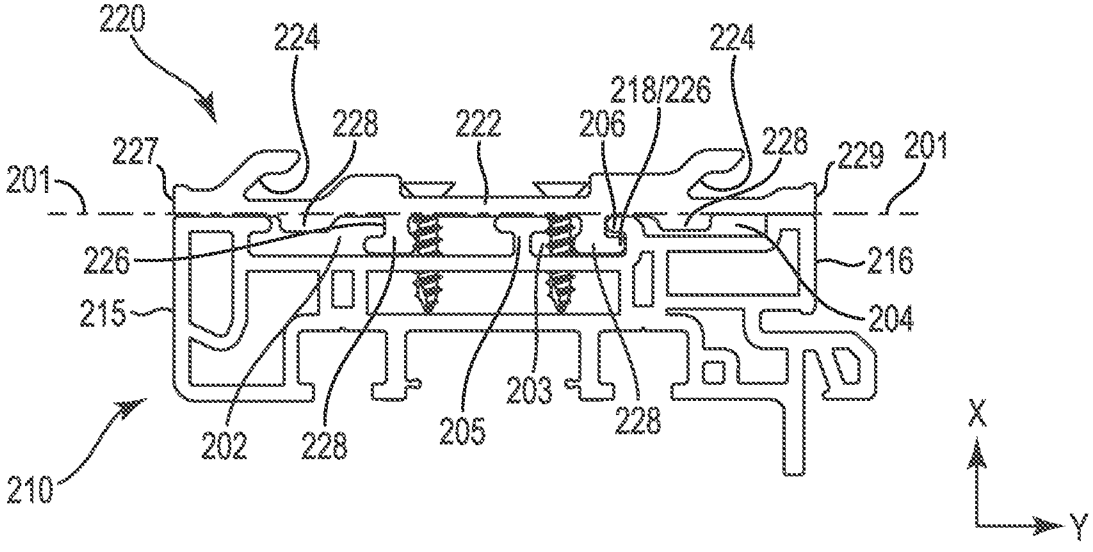
FIG. 11 is an end view of the components of FIG. 10 taken along the Z-axis after attachment of the joining strip to the frame member.

Another illustrative embodiment of a mull joint in one embodiment of a compound fenestration assembly including joining strips as described herein is depicted in FIGS. 8-11. In particular FIG. 8 is an end view of the frame members of a pair of adjacent fenestration units 210 (with other components such as sash channels, sash frames, glazing, etc. removed) and a pair of flanged joining strips 220 and 230 forming a mull joint between the frame members of the fenestration units 210. The end view of FIG. 8 is taken along the mull joint axis 211 corresponding to the Z-axis of the Cartesian coordinate system depicted in FIGS. 8-11. FIGS. 9-11 depicted the assembly of a joining strip 220 with frame member of fenestration unit 210. Once in position, the joining strip 220 may preferably be secured in place using, e.g., mechanical fasteners as depicted in FIGS. 9-11. In one or more alternative embodiments, the joining strip 220 may be secured in position on the frame member of fenestration unit 210 using one or more suitable techniques such as, e.g., mechanical fasteners, adhesives, chemical welding, thermal welding, etc.

In the depicted embodiment, joining strip 220 is attached to the frame member of the left side fenestration unit 210 and includes a pair of mulling channels 224, while joining strip 230 attached to the frame member of the right side fenestration unit 210 includes a pair of complementary channels 234. Mulling channels 224 of joining strip 220 may be described as opening towards the exterior side of the fenestration units 210 while channels 234 of joining strip 230 may be described as opening towards the interior side of the fenestration units 210. As such, the joining strips 220 and 230 are oriented such that the mulling channels 224 and 234 nest with each other.

As a result, a secure connection between the joining strips 220 and 230 is obtained through the nested channel structures 224/234 in the opposing joining strips 220 and 230, with the nested joining strips resisting movement of the fenestration units relative to each other. For example, the mull joints and compound fenestration assemblies in which mull joints are found may be described as defining an interior/exterior axis that extends between the interior and exterior sides of the mull joint. In the depicted illustrative embodiment as seen in FIG. 8, the interior/exterior axis corresponds to the Y-axis of the depicted Cartesian coordinate system.

Also with reference to FIG. 8, the frame member of the left side fenestration unit 210 may be described as facing the frame member of the right side fenestration unit 210 across the mull joint, with a separation axis extending through the mull joint between the left and right side fenestration units 210. In the depicted illustrative embodiment as seen in FIG. 8, the separation axis corresponds to the X-axis of the depicted Cartesian coordinate system.

The interior/exterior axis, separation axis, and mull joint axis are all, in one or more embodiments, perpendicular to each other. These relationships can be seen in many of the figures used to describe the illustrative embodiments of the compound fenestration assemblies and mull joints herein. As noted above, the interior/exterior axis corresponds to the Y-axis, the separation axis corresponds to the X-axis, and the mull joint axis (211 in FIG. 8) corresponds to the Z axis of the Cartesian coordinate systems as depicted in the figures.

In connection with the illustrative embodiment depicted in FIG. 8, the nested mulling channels 224/234 of the joining strips 220 and 230 may be described as preventing movement of the left and right side fenestration members 210 away from each other along the separation axis (i.e., the X-axis while also preventing movement of the left side fenestration unit 210 along the interior/exterior axis towards the exterior sides of the fenestration units 210 (on which trim strip 212 is located) and preventing movement of the right side fenestration unit 210 along the interior/exterior axis towards the interior sides of the fenestration units 210 (on which trim strip 214 is located).

Although the depicted embodiment of joining strips 220 and 230 include pairs of nested mulling channels 224 and 234, the function of the joining strips in preventing movement of the fenestration units relative to each other along both the interior/exterior axis and the separation axis may be accomplished using only one pair of nested channels, with, for example, joining strip 220 including only one of nesting mulling channels 224 and joining strip 230 including only one of nesting channels 234, with the single pair of nested mulling channels 224/234 on joining strips 220 and 230 performing those functions.

Joining strips having nested channels facing each other across a mull joint such as those provided in the compound fenestration assembly depicted in FIGS. 8-11 along with other mull joint features that may be used in the compound fenestration assemblies described herein may be described more completely in, for example, U.S. Pat. Nos. 10,626,664 & 10,968,687 (both to Kelley et al.).

As discussed herein, the joining strips used in the compound fenestration assembly mull joints described herein are configured to improve the strength of the mull joints in which they are used. Although increased strength in the mull joints is desirable, increase strength could be achieved by providing mull joints that are thicker (as measured along the separation axis) but it is also desirable to provide a mull joint that is as narrow as possible to improve the overall appearance of a compound fenestration assembly, reduce weight, reduce costs, etc.

Mull planes 201 and 201' defined by the frame members of fenestration units 210 and 210' are depicted in FIG. 8 and can be useful when discussing the relationship between the joining strips 220/230 and their respective frame members of fenestration units 210/210'. In particular, left side frame member of fenestration unit 210 can be described as having a mull surface facing the right side frame member of fenestration unit 210' across the mull joint and the right side frame member of fenestration unit 210' can be described as having a mull surface facing the frame member of fenestration unit 210 across the mull joint. The mull surface of the frame member of fenestration unit 210 defines mull plane 201 which extends between the interior side 215 and the exterior side 216 of the frame member of fenestration unit 210 (and also along a length of the frame member of fenestration unit 210 from the first end to the second end of the mull joint, i.e., into and/or out of the page along the mull joint axis 211). The mull surface of the frame member of fenestration unit 210' defines mull plane 201' which extends between the interior side 215' and the exterior side 216' of the frame member of fenestration unit 210' (and also along a length of the frame member of fenestration unit 210' from the first end to the second end of the mull joint, i.e., into and/or out of the page along the mull joint axis 211). In particular, the mull planes 201/201' are defined by the junctions between the mull surfaces of the frame members of fenestration units 210/210' at their respective interior and exterior sides 215, 216, 215', 216'. In terms of the Cartesian coordinate system provided in the figures, the mull planes 201 and 201' can be described as Y-Z planes extending across the frame members of fenestration units 210 and 210'.

With reference to FIGS. 8, 10, and 11, the mull surface of the of the frame member of fenestration unit 210 (the mull surface being the surface of the frame member of fenestration unit 210 facing the frame member of the opposing or adjacent fenestration unit 210' in, e.g., FIG. 8) includes frame cavities 202, 203, 204 extending into the frame member of fenestration unit 210 such that each frame cavity 202, 203, 204 is located between mull plane 201 and the mull surface of the frame member of fenestration unit 210. The frame cavities 202, 203, 204 are defined, in the depicted embodiment, by optional intermediate supports 205 and 206 in contact with the web 222 of joining strip 220. In the depicted embodiment, intermediate support 205 is located between frame cavities 202 and 203 and intermediate support 206 is located between frame cavities 203 and 204. In one or more embodiments, at least one of the intermediate supports 205 and 206 is located between the reinforcing ribs 228 on web 222 of joining strip 220. With reference to FIG. 8, the frame member of fenestration unit 210' also includes frame cavities 202', 203', 204' are defined, in the depicted embodiment, by optional intermediate supports 205' and 206' in contact with the web 232 of joining strip 230. The intermediate supports 205, 206, 205', 206' may, in one or more embodiments, provide additional structural support to the webs 222 and 232 of the joining strips 220 and 230.

Although the depicted embodiments of the frame members of fenestration units 210 and 210' include three separate and distinct frame cavities separated by intermediate supports, one or more alternative embodiments of frame members of fenestration units used in compound fenestration assemblies as described herein may include only one frame cavity (with no intermediate support), two frame cavities, or four more frame cavities.

The illustrative embodiment of joining strips 220 and 230 used in the mull joint depicted in FIG. 8 include a web 222 for joining strip 220 and web 232 for joining strip 230, with the webs 222 and 232 spanning the mull joint between the exterior sides 216, 216' and the interior sides 215, 215' of the frame members of the fenestration units 210 and 210'. In the depicted illustrative embodiment, the web 222 extends from the interior edge 227 to the exterior edge 229 of the joining strip 220 and web 232 extends from the interior edge 237 to the exterior edge 239 of the joining strip 230.

The illustrative embodiment of joining strip 220 includes reinforcing ribs 228 that extend away from the web 222 towards mull surface of the frame member of the left side fenestration unit 210 to, as described herein, provide additional material to the joining strip 220 that strengthens the resistance of the joining strip 220 to bending about both the X and Y axes (i.e., the separation and interior/exterior axes). Although the depicted embodiment of joining strip 220 includes four reinforcing ribs 228, one or more alternative embodiments of joining strips used in compound fenestration assemblies as described herein may include only two reinforcing ribs, three reinforcing ribs, or five or more reinforcing ribs.

With reference to FIG. 11 in which the joining strip 220 is placed on and attached to the frame member of fenestration unit 210, the joining strip 220 is located on frame member of fenestration unit 210 such that its interior edge 227 and exterior edge 229 abut the corners formed by the mull surface with the interior side 215 and exterior side 216 of the frame member of fenestration unit 210. In its position on frame member of fenestration unit 210, the reinforcing ribs 228 of the joining strip 220 extend into frame cavities 202, 203, and 204 in the frame member of fenestration unit 210 such that the mull plane 201 defined by the frame member of fenestration unit 210 intersects the reinforcing ribs 228 extending into frame cavities 202, 203, and 204 (noting that two or more of the reinforcing ribs 228 may extend into the same frame cavity as seen with the two left-most reinforcing ribs 228 extending into frame cavity 202 in FIG. 11). As a result, the reinforcing ribs 228 are intersected by the mull plane 201 such that at least a portion of each reinforcing rib 228 is located between the mull plane 201 and the mull surface of the frame member of fenestration unit 210.

As described herein, the reinforcing ribs 228 on the joining strip 220 increase the strength of the joining strip 220 (by, e.g., increasing the moment of inertia of the joining strip) and the frame cavities 202, 203, and 204 on the frame member of fenestration unit 210 provide space for the reinforcing ribs 228 without requiring more distance between the frame member of fenestration unit 210 and the opposing frame member of fenestration unit 210' (see FIG. 8).

With reference to FIG. 8, the depicted illustrative embodiment of joining strip includes corresponding features that have corresponding relationships to those depicted and described with respect to joining strip 220 and frame member of fenestration unit 210. For example, joining strip 230 includes reinforcing ribs 238 on web 232 that extend into frame cavities 202', 203', and 204' provided in the mull surface of frame member of fenestration unit 210'. The frame cavities are, in the depicted embodiment, similarly defined by intermediate supports 205' and 206' on the mull surface of frame member of fenestration unit 210'. As a result, the reinforcing ribs 238 on the joining strip 230 also increase the strength of the joining strip 230 (by, e.g., increasing the moment of inertia of the joining strip) and the frame cavities 202', 203', and 204' on the frame member of fenestration unit 210' provide space for the reinforcing ribs 238 without requiring more distance between the frame member of fenestration unit 210 and the opposing frame member of fenestration unit 210'.

The illustrative embodiment of joining strip 220 on the left side of the mull joint as depicted in FIG. 8 (and also depicted in FIGS. 9-11) includes a pair of selected reinforcing ribs 228 that define retaining channels 226 that open towards opposite sides of the mull joint. With reference to FIGS. 8 and 10-11, one retaining channel 226 formed in reinforcing rib 228 faces the interior side 215 of the frame member of fenestration unit 210 (i.e., towards the bottom of FIG. 8 and to the left in FIGS. 10-11) while another retaining channel 226 formed in the other reinforcing rib 228 faces the exterior side 216 of the frame member of fenestration unit 210 (i.e., towards the top of FIG. 8 and to the right in FIGS. 10-11). As a result, the retaining channels 226 in the selected reinforcing ribs 228 may be described as opening in opposite directions.

In the depicted illustrative embodiment, a selected frame cavity (i.e., frame cavity 203) of frame member of fenestration unit 210 includes a frame channel 218 that opens in a direction opposite from the direction in which at least one of the retaining channels 226 on the joining strip 220 opens. In the depicted illustrative embodiment, the frame channel 218 opens towards the exterior side 215 of frame member of fenestration unit 210.

When the joining strip 220 is assembled with frame member of fenestration unit 210 of the mull joint as depicted in FIGS. 8 and 11, the retaining channel 226 of the reinforcing rib 228 located closer to the exterior side 216 of the frame member of fenestration unit 210 mechanically interlocks with the frame channel 218 on the frame member of fenestration unit 210. The mechanically interlocking retaining channel 226 and frame channel 218 prevent movement of the joining strip 220 away from the frame member of fenestration unit 210 along the separation axis (i.e., the X axis as seen in the Cartesian coordinate system depicted in FIGS. 8 and 11). The mechanically interlocking retaining channel 226 and frame channel 218 also prevent movement of the joining strip 220 towards the exterior side 216 of the frame member of fenestration unit 210 along the interior/exterior axis (i.e., the Y-axis as seen in the Cartesian coordinate system depicted in FIGS. 8 and 11).

As discussed herein, the mechanically interlocking channels on the joining strips and frame members provide a mull joint having an improved strength as compared to mull joints lacking the mechanically interlocking channels between the joining strips and the frame members. The improved strength offered by both the reinforcing ribs on the joining strips and the mechanically interlocking channels on the joining strips and the frame members can, in one or more embodiments, provide a mull joint having a reduced width that still provides sufficient strength to maintain integrity of the compound fenestration assembly incorporating the mull joint when subjected to, e.g., wind loads and other forces.

The illustrative embodiment of joining strip 230 on the left side of the mull joint as depicted in FIG. 8 includes a pair of selected reinforcing ribs 238 that define retaining channels 236 that open towards opposite sides of the mull joint. One retaining channel 236 formed in reinforcing rib 238 faces the interior side 215' of the frame member of fenestration unit 210' (i.e., towards the bottom of FIG. 8) while another retaining channel 236 formed in the other reinforcing rib 238 faces the exterior side 216' of the frame member of fenestration unit 210' (i.e., towards the top of FIG. 8). As a result, the retaining channels 236 in the selected reinforcing ribs 238 may be described as opening in opposite directions.

the frame member of fenestration unit 210' also includes a selected frame cavity (i.e., frame cavity 203') of frame member of fenestration unit 210' with a frame channel 218' that opens in a direction opposite from the direction in which at least one of the retaining channels 236 on the joining strip 230 opens. In the depicted illustrative embodiment, the frame channel 218' opens towards the interior side 215' of frame member of fenestration unit 210'.

When the joining strip 230 is assembled with frame member of fenestration unit 210' of the mull joint as depicted in FIG. 8, the retaining channel 236 of the reinforcing rib 238 located closer to the exterior side 216' of the frame member of fenestration unit 210' mechanically interlocks with the frame channel 218' on the frame member of fenestration unit 210'. The mechanically interlocking retaining channel 236 and frame channel 218' prevent movement of the joining strip 230 away from the frame member of fenestration unit 210' along the separation axis (i.e., the X axis as seen in the Cartesian coordinate system depicted in FIG. 8). The mechanically interlocking retaining channel 236 and frame channel 218' also prevent movement of the joining strip 230 towards the exterior side 216' of the frame member of fenestration unit 210' along the interior/exterior axis (i.e., the Y-axis as seen in the Cartesian coordinate system depicted in FIG. 8).

As discussed herein, the mechanically interlocking channels 218'/236 on the joining strip 230 and frame member of fenestration unit 210' provide a mull joint having an improved strength as compared to mull joints lacking the mechanically interlocking channels between the joining strip 230 and frame member of fenestration unit 210'. The improved strength offered by both the reinforcing ribs 238 on the joining strip 230 and the mechanically interlocking channels 218'/236 on the joining strip 230 and frame member of fenestration unit 210' can, in one or more embodiments, provide a mull joint having a reduced width that still provides sufficient strength to maintain integrity of the compound fenestration assembly incorporating the mull joint when subjected to, e.g., wind loads and other forces.

In one or more embodiments of joining strips including reinforcing ribs (with or without retaining channels) and frame members of fenestration units including frame channels used in mull joints as described herein, one or all of the reinforcing ribs, retaining channels, and frame channels may extend along substantially an entire length of the mull joint. In the case of joining strips, the reinforcing ribs and retaining channels may extend from the first end to the second end of the joining strip and in the case of frame channels, the frame channels may extend along the entire length of a frame member spanning the length of a mull joint along the mull joint axis. Although both the retaining channels and the frame channels may extend continuously along the length of a mull joint, such a construction is not required in one or both of the retaining channels and frame channels may be discontinuous along the length of the mull joint.

In one or more embodiments of joining strips including reinforcing ribs that define retaining channels used in mull joints as described herein, the joining strip may include a pair of retaining channels. Providing a pair of retaining channels on a joining strip used in the mull joints described herein in which the frame members of the fenestration units to be joined include only a single frame channel may allow for the joining strips used on opposite sides of a mull joint to be different lengths of a common extruded member, with each of the joining strips rotated to position the different joining strips on opposite sides of mull joints described herein. As a result, the manufacturer need only produce a single type of joining strip for use in forming both joining strips on opposite sides of the mull joints as described herein.

Figure 12:
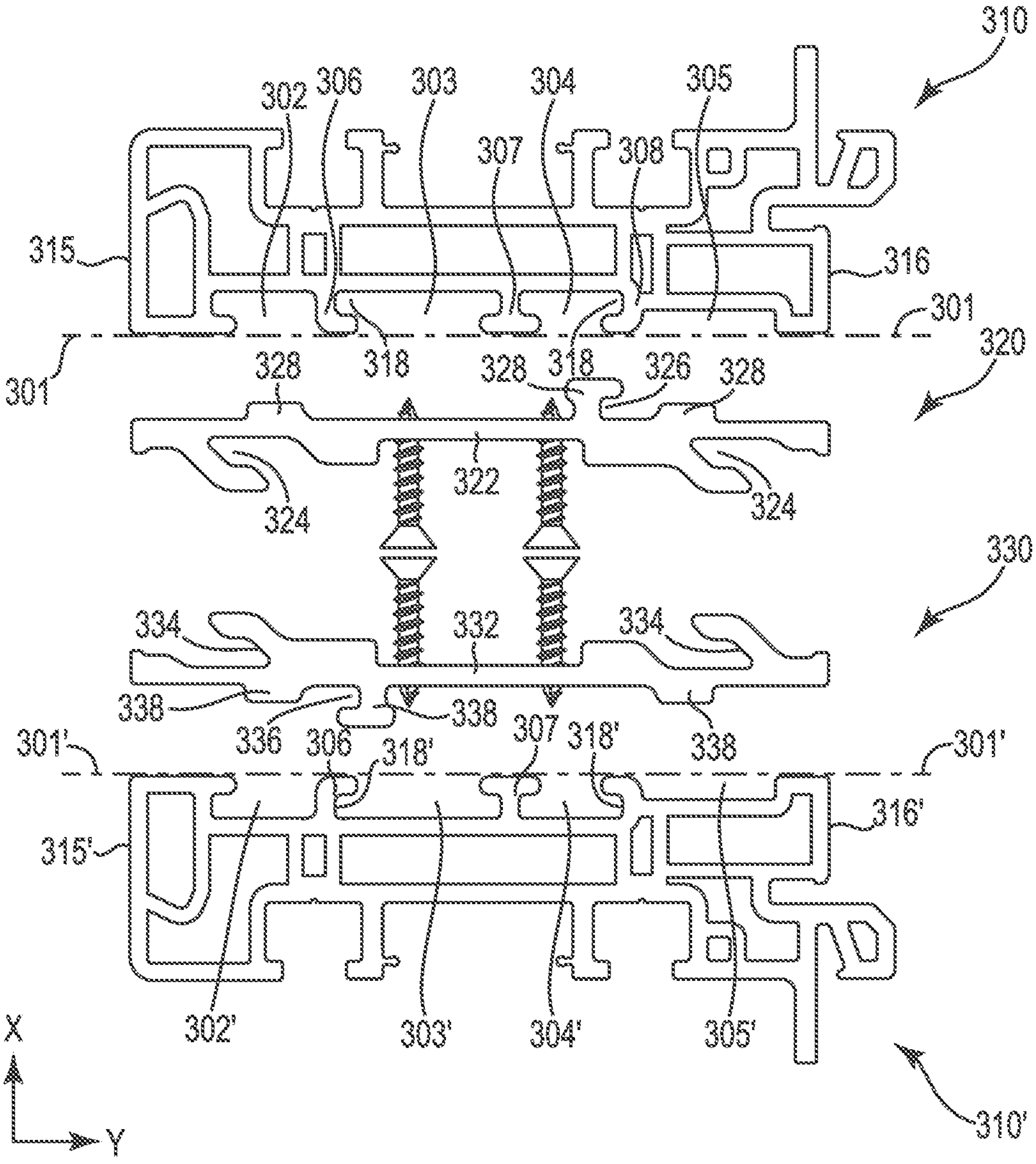
FIG. 12 is an exploded end view (taken along the mull joint axis/Z-axis) of another illustrative embodiment of a compound fenestration assembly depicting the frame members of a pair of adjacent fenestration units and a pair of flanged joining strips used to form a mull joint between the frame members as described herein.
Figure 13:
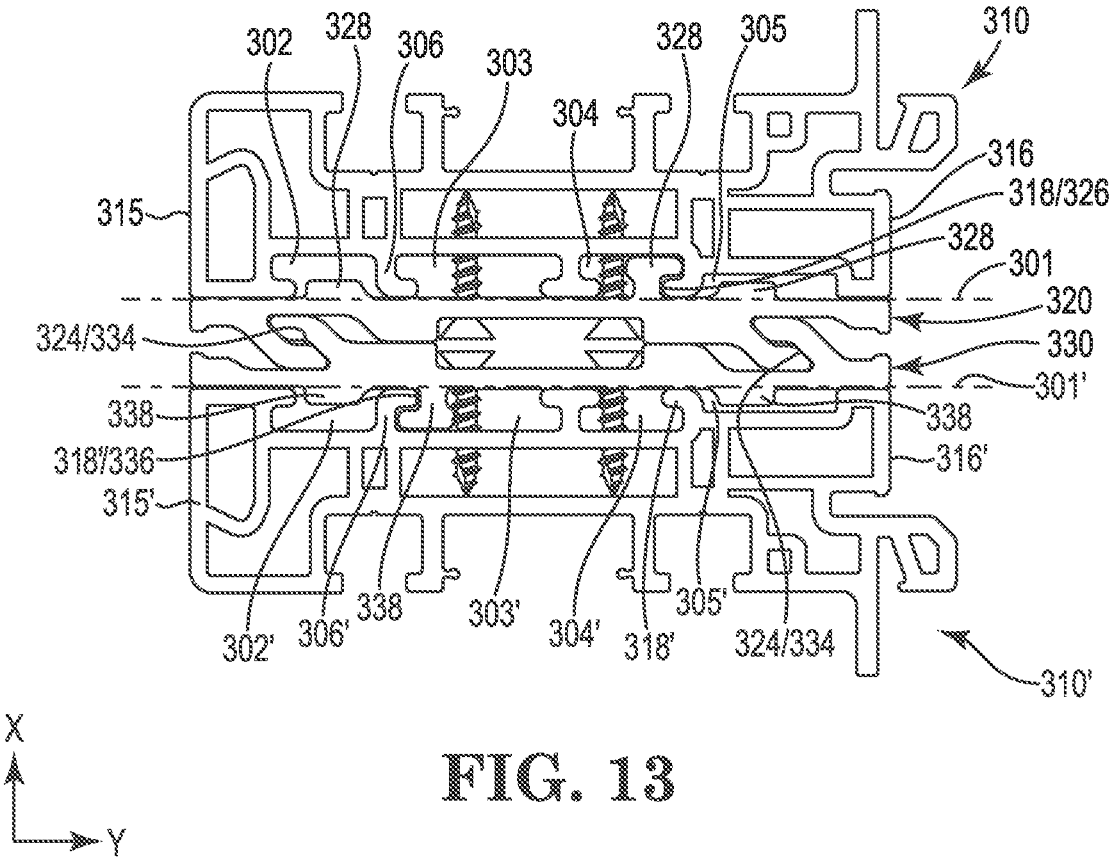
FIG. 13 is an end view (taken along the Z-axis) of the mull joint components of FIG. 12 after assembly of the components to form a mull joint herein.

Although the mull joints described in connection with FIGS. 9-11 including a pair of retaining channels on joining strips and frame channels on frame members provide one set of embodiments of mull joints including joining strips and frame members as described herein, FIGS. 12-13 depict an alternative embodiment in which the joining strips include reinforcing ribs that have only a single retaining channel while the frame members include a pair of frame channels.

As depicted in FIG. 12, the frame members 310 of a pair of fenestration units 310 and 310' are positioned proximate each other with the exterior sides 316 and 316' of the frame members being located on the right hand of FIG. 12 and the interior sides 315 and 315' of the frame members of fenestration units 310 and 310' being located on the left side of FIG. 12. A pair of joining strips 320 and 330 are positioned between the frame members of fenestration units 310 and 310' with the upper joining strip 320 including a pair of mulling channels 324 configured to engage a complementary pair of mulling channels 334 on lower joining strip 330 in the same manner as described in connection with the other mull joints discussed herein.

As noted above, however, upper joining strip 320 includes only a single retaining channel 326 formed in one of the reinforcing ribs 328 on the joining strip 320 that face the frame member of upper fenestration unit 310, while lower joining strip 330 includes only a single retaining channel 336 formed in one of the reinforcing ribs 338 on the joining strip 330 that face the frame member of lower fenestration unit 310'. Retaining channel 326 on upper joining strip 320 opens towards the exterior side 316 of the frame member of upper fenestration unit 310 when assembled in the mull joint of FIG. 13 and retaining channel 336 on lower joining strip 330 opens towards the exterior side 316' of the frame member of the lower fenestration unit 310' when assembled in the mull joint of FIG. 13.

The frame member of upper fenestration unit 310 includes a mull surface having frame cavities 302, 303, 304, 305 defined by intermediate supports 306, 307, and 308, with a pair of frame channels 318 formed in frame cavities 303 and 304 by intermediate supports 306 and 308. The frame channels 318 open towards each other on the frame member of fenestration unit 310. As a result, the frame channel 318 closer to the exterior side 316 of the frame member of upper fenestration unit 310 opens towards the interior side 315 of the frame member of fenestration unit 310, while the frame channel 318 closer to the interior side 315 of the frame member of the upper fenestration unit 310 opens towards the exterior side of the frame member of fenestration unit 310.

Similarly, the frame member of lower fenestration unit 310' includes a mull surface having frame cavities 302', 303', 304', 305' defined by intermediate supports 306', 307', and 308', with a pair of frame channels 318' formed in frame cavities 303' and 304' by intermediate supports 306' and 308'. The frame channels 318' also open towards each other on the frame member of the lower fenestration unit 310'. As a result, the frame channel 318' closer to the exterior side 316' of the frame member of lower fenestration unit 310' opens towards the interior side 315' of the frame member of fenestration unit 310', while the frame channel 318' closer to the interior side 315' of the frame member of fenestration unit 310' opens towards the exterior side 316' of that frame member.

One difference between the mull joints formed using interlocking retaining and frame channels as depicted in FIGS. 8 and 13 is that the mechanically interlocking retaining and frame channels 218/226 on the left side of the mull joint depicted in FIG. 8 are aligned with the mechanically interlocking retaining and frame channels 218'/236 on the right side of the mull joint depicted in FIG. 8 along the separation axis (i.e., the X-axis as depicted in FIG. 8). In contrast, the mechanically interlocking retaining and frame channels 318/326 on the upper side of the mull joint depicted in FIG. 13 are offset from the mechanically interlocking retaining and frame channels 318'/336 on the lower side of the mull joint depicted in FIG. 13 along the separation axis (i.e., the X-axis as depicted in FIG. 13).

The joining strips used in mull joints of the compound fenestration assemblies as described herein may be constructed of one or more suitable materials that provide sufficient mechanical strength to the resulting mull joints. In one or more embodiments, the materials used may limit thermal conductivity to enhance the thermal performance of compound fenestration assemblies as described herein. In one or more embodiments, the joining strips may be constructed of, e.g., one or more of fiberglass, polymeric materials, metals, wood, wood composites, etc. In one or more embodiments, the joining strips may be constructed of materials that have lower thermal conductivity than, e.g., metals. In one or more embodiments, however, metals (or other more thermally conductive materials) may be used to construct the joining strips where, for example, a thermal break or other feature may be provided to limit thermal conductivity through the joining strips between the exterior and interior sides of a compound fenestration assembly as described herein is not required and/or desired.

The intermediate structures that, in some cases, form frame channels provided on the frame members of the fenestration units of the compound fenestration assemblies as described herein may be constructed as integral features of the frame members where, for example, the frame members are formed through extrusion, pultrusion, and similar processes. Alternatively, a frame channel that mechanically interlocks with retaining channels on the joining strips used in the mull joints described herein may be provided by a separate and discrete component attached to a frame member such that the resulting composite frame member includes a frame channel that is compatible with the retaining channels on the joining strips described herein.

The complete disclosure of the patents, patent documents, and publications identified herein are incorporated by reference in their entirety as if each were individually incorporated. To the extent there is a conflict or discrepancy between this document and the disclosure in any such incorporated document, this document will control.

Illustrative embodiments of compound fenestration assemblies, mulling systems, and methods are discussed herein some possible variations have been described. These and other variations and modifications in the invention will be apparent to those skilled in the art without departing from the scope of the invention, and it should be understood that this invention is not limited to the illustrative embodiments set forth herein. Accordingly, the invention is to be limited only by the claims provided below and equivalents thereof. It should also be understood that this invention also may be suitably practiced in the absence of any element not specifically disclosed as necessary herein.

What is claimed is:

1. A compound fenestration assembly comprising:

a first frame member of a first fenestration unit attached to a second frame member of a second fenestration unit along a mull joint having a first end and a second end, wherein the mull joint defines a mull joint axis extending along a length of the mull joint between the first and second ends of the mull joint, wherein the first and second frame members comprise exterior sides facing in the same direction and interior sides facing in an opposite direction from the exterior sides, wherein an interior/exterior axis extends between the interior and exterior sides of the first and second frame members in a direction transverse to the mull joint axis, wherein the first frame member faces the second frame member across the mull joint, wherein a separation axis extends through the mull joint between the first and second frame members, the separation axis extending in a direction transverse to both the mull joint axis and the interior/exterior axis;

wherein the first frame member defines a first frame member mull surface facing the second frame member across the mull joint, the first frame member mull surface defining a first frame member mull plane extending between the interior side and the exterior side of the first frame member and along a length of the first frame member from the first end to the second end of the mull joint, the first frame member comprising a first frame member cavity extending into the first frame member such that the first frame member cavity is located between the first frame member mull plane and the first frame member mull surface, the first frame member cavity aligned with and extending along the mull joint axis, the first frame member cavity located between the interior and exterior sides of the first frame member along the interior/exterior axis;

wherein the second frame member defines a second frame member mull surface facing the first frame member across the mull joint, the second frame member comprising a second member frame cavity extending into the second frame member in a direction away from the first frame member, the second frame member cavity aligned with and extending along the mull joint axis, the second frame member cavity located between the interior and exterior sides of the second frame member along the interior/exterior axis;

a first joining strip attached to the first frame member of the first fenestration unit, the first joining strip comprising a mulling channel aligned with the mull joint axis, the mulling channel opening towards the exterior side of the first frame member, the first joining strip comprising a first web extending from an interior edge proximate the interior side of the first frame member to an exterior edge proximate the exterior side of the first frame member;

a second joining strip attached to the second frame member of the second fenestration unit, the second joining strip comprising a mulling channel aligned with the mull joint axis, the mulling channel opening towards the interior side of the second frame member such that the mulling channel on the first joining strip nests with the mulling channel on the second joining strip, wherein the mulling channel on the first joining strip and the mulling channel on the second joining strip prevent movement of the first frame member away from the second frame member along the separation axis, prevent movement of the first frame member towards the exterior side of the second frame member along the interior/exterior axis, and prevent movement of the second frame member towards the interior side of the first frame member along the interior/exterior axis, and wherein the second joining strip comprises a second web extending from an interior edge proximate the interior side of the second frame member to an exterior edge proximate the exterior side of the second frame member;

wherein the second frame member defines a second frame member mull surface facing the first frame member across the mull joint, the second frame member comprising a plurality of second frame member cavities extending into the second frame member in a direction away from the first frame member, wherein each second frame member cavity of the plurality of second member frame cavities is aligned with and extends along the mull joint axis, the plurality of second member frame cavities located between the interior and exterior sides of the second frame member;

wherein the first joining strip comprises a plurality of reinforcing ribs extending from the web of the first joining strip towards the first frame member, the plurality of reinforcing ribs located between the interior and exterior edges of the first joining strip, wherein each reinforcing rib of the plurality of reinforcing ribs extends into a selected first frame member cavity of the plurality of first frame member cavities such that each reinforcing rib of the plurality of reinforcing ribs is intersected by the first frame member mull plane such that the at least a portion of each reinforcing rib is located between the first frame member mull plane and the first frame member mull surface, wherein a selected reinforcing rib of the plurality of reinforcing ribs defines a first retaining channel opening towards a selected side of the mull joint comprising one of the exterior side and the interior side of the first frame member;

wherein a selected first frame member cavity of the plurality of first frame member cavities comprises a first frame channel opening away from the selected side of the mull joint;

and wherein the first retaining channel mechanically interlocks with the first frame channel such that movement of the first joining strip away from the first frame member along the separation axis is prevented and movement of the first joining strip towards the selected side of the first frame member along the interior/exterior axis is prevented.

2. A compound fenestration assembly according to claim 1, wherein two reinforcing ribs of the plurality of reinforcing ribs extend into the selected first frame member cavity.

3. A compound fenestration assembly according to claim 1, wherein adjacent pairs of first frame member cavities of the plurality of first frame member cavities are separated by an intermediate support extending along the mull axis on the first frame member mull surface.

4. A compound fenestration assembly according to claim 3, wherein the intermediate support comprises a distal edge in contact with the web of the first joining strip between an adjacent pair of reinforcing ribs extending from the web of the first joining strip.

5. A compound fenestration assembly according to claim 1, wherein adjacent pairs of first frame member cavities of the plurality of first frame member cavities are separated by an intermediate support extending along the mull axis on the first frame member mull surface, and wherein the first frame channel is formed by the intermediate support.

6. A compound fenestration assembly according to claim 1, wherein the first retaining channel is located between the first frame member mull plane and the first frame member mull surface.

7. A compound fenestration assembly according to claim 1, wherein the first joining strip comprises an exterior flange located along the exterior edge of the web of the first joining strip and an interior flange located along the interior edge of the web of the first joining strip, wherein the exterior flange and the interior flange both extend away from the mull joint to a free edge in a direction aligned with the separation axis such that a portion of the first frame member of the first fenestration unit is located between the exterior flange and the interior flange of the first joining strip.

8. A compound fenestration assembly comprising:

a first frame member of a first fenestration unit attached to a second frame member of a second fenestration unit along a mull joint having a first end and a second end, wherein the mull joint defines a mull joint axis extending along a length of the mull joint between the first and second ends of the mull joint, wherein the first and second frame members comprise exterior sides facing in the same direction and interior sides facing in an opposite direction from the exterior sides, wherein an interior/exterior axis extends between the interior and exterior sides of the first and second frame members in a direction transverse to the mull joint axis, wherein the first frame member faces the second frame member across the mull joint, wherein a separation axis extends through the mull joint between the first and second frame members, the separation axis extending in a direction transverse to both the mull joint axis and the interior/exterior axis;

wherein the first frame member defines a first frame member mull surface facing the second frame member across the mull joint, the first frame member mull surface defining a first frame member mull plane extending between the interior side and the exterior side of the first frame member and along a length of the first frame member from the first end to the second end of the mull joint, the first frame member comprising a first frame member cavity extending into the first frame member such that the first frame member cavity is located between the first frame member mull plane and the first frame member mull surface, the first frame member cavity aligned with and extending along the mull joint axis, the first frame member cavity located between the interior and exterior sides of the first frame member along the interior/exterior axis;

wherein the second frame member defines a second frame member mull surface facing the first frame member across the mull joint, the second frame member comprising a second member frame cavity extending into the second frame member in a direction away from the first frame member, the second frame member cavity aligned with and extending along the mull joint axis, the second frame member cavity located between the interior and exterior sides of the second frame member along the interior/exterior axis;

a first joining strip attached to the first frame member of the first fenestration unit, the first joining strip comprising a mulling channel aligned with the mull joint axis, the mulling channel opening towards the exterior side of the first frame member, the first joining strip comprising a first web extending from an interior edge proximate the interior side of the first frame member to an exterior edge proximate the exterior side of the first frame member;

a second joining strip attached to the second frame member of the second fenestration unit, the second joining strip comprising a mulling channel aligned with the mull joint axis, the mulling channel opening towards the interior side of the second frame member such that the mulling channel on the first joining strip nests with the mulling channel on the second joining strip, wherein the mulling channel on the first joining strip and the mulling channel on the second joining strip prevent movement of the first frame member away from the second frame member along the separation axis, prevent movement of the first frame member towards the exterior side of the second frame member along the interior/exterior axis, and prevent movement of the second frame member towards the interior side of the first frame member along the interior/exterior axis, and wherein the second joining strip comprises a second web extending from an interior edge proximate the interior side of the second frame member to an exterior edge proximate the exterior side of the second frame member;

wherein the second frame member defines a second frame member mull surface facing the first frame member across the mull joint, the second frame member comprising a plurality of second frame member cavities extending into the second frame member in a direction away from the first frame member, wherein each second frame member cavity of the plurality of second member frame cavities is aligned with and extends along the mull joint axis, the plurality of second member frame cavities located between the interior and exterior sides of the second frame member;

wherein the first joining strip comprises a plurality of reinforcing ribs extending from the web of the first joining strip towards the first frame member, the plurality of reinforcing ribs located between the interior and exterior edges of the first joining strip, wherein each reinforcing rib of the plurality of reinforcing ribs extends into a selected first frame member cavity of the plurality of first frame member cavities such that each reinforcing rib of the plurality of reinforcing ribs is intersected by the first frame member mull plane such that the at least a portion of each reinforcing rib is located between the first frame member mull plane and the first frame member mull surface;

wherein a selected reinforcing rib of the plurality of reinforcing ribs defines a first retaining channel opening towards a selected side of the mull joint comprising one of the exterior side and the interior side of the first frame member;

wherein a selected first frame member cavity of the plurality of first frame member cavities comprises a first frame channel opening away from the selected side of the mull joint;

wherein the first retaining channel mechanically interlocks with the first frame channel such that movement of the first joining strip away from the first frame member along the separation axis is prevented and movement of the first joining strip towards the selected side of the first frame member along the interior/exterior axis is prevented;

wherein two reinforcing ribs of the plurality of reinforcing ribs extend into the selected first frame member cavity;

and wherein adjacent pairs of first frame member cavities of the plurality of first frame member cavities are separated by an intermediate support extending along the mull axis on the first frame member mull surface.

9. A compound fenestration assembly according to claim 8, wherein the intermediate support comprises a distal edge in contact with the web of the first joining strip between an adjacent pair of reinforcing ribs extending from the web of the first joining strip.

10. A compound fenestration assembly according to claim 8, wherein the second frame member mull surface defines a second frame member mull plane extending between the interior side and the exterior side of the second frame member and along a length of the second frame member from the first end to the second end of the mull joint, wherein a mull joint thickness measured along the separation axis is defined by a distance between the first frame member mull plane and the second frame member mull plane at the interior sides of the first and second frame members, wherein the first and second joining strips define a joining strip thickness measured along the separation axis, and wherein the joining strip thickness measured through a selected reinforcing rib of the plurality of reinforcing ribs is greater than the mull joint thickness.

11. A compound fenestration assembly according to claim 8, wherein adjacent pairs of first frame member cavities of the plurality of first frame member cavities are separated by an intermediate support extending along the mull axis on the first frame member mull surface, and wherein the first frame channel is formed by the intermediate support.

12. A compound fenestration assembly according to claim 8, wherein the first retaining channel is located between the first frame member mull plane and the first frame member mull surface.

13. A compound fenestration assembly according to claim 8, wherein the first joining strip comprises an exterior flange located along the exterior edge of the web of the first joining strip and an interior flange located along the interior edge of the web of the first joining strip, wherein the exterior flange and the interior flange both extend away from the mull joint to a free edge in a direction aligned with the separation axis such that a portion of the first frame member of the first fenestration unit is located between the exterior flange and the interior flange of the first joining strip.

14. A compound fenestration assembly comprising:

a first frame member of a first fenestration unit attached to a second frame member of a second fenestration unit along a mull joint having a first end and a second end, wherein the mull joint defines a mull joint axis extending along a length of the mull joint between the first and second ends of the mull joint, wherein the first and second frame members comprise exterior sides facing in the same direction and interior sides facing in an opposite direction from the exterior sides, wherein an interior/exterior axis extends between the interior and exterior sides of the first and second frame members in a direction transverse to the mull joint axis, wherein the first frame member faces the second frame member across the mull joint, wherein a separation axis extends through the mull joint between the first and second frame members, the separation axis extending in a direction transverse to both the mull joint axis and the interior/exterior axis;

wherein the first frame member defines a first frame member mull surface facing the second frame member across the mull joint, the first frame member mull surface defining a first frame member mull plane extending between the interior side and the exterior side of the first frame member and along a length of the first frame member from the first end to the second end of the mull joint, the first frame member comprising a first frame member cavity extending into the first frame member such that the first frame member cavity is located between the first frame member mull plane and the first frame member mull surface, the first frame member cavity aligned with and extending along the mull joint axis, the first frame member cavity located between the interior and exterior sides of the first frame member along the interior/exterior axis;

wherein the second frame member defines a second frame member mull surface facing the first frame member across the mull joint, the second frame member comprising a second member frame cavity extending into the second frame member in a direction away from the first frame member, the second frame member cavity aligned with and extending along the mull joint axis, the second frame member cavity located between the interior and exterior sides of the second frame member along the interior/exterior axis;

a first joining strip attached to the first frame member of the first fenestration unit, the first joining strip comprising a mulling channel aligned with the mull joint axis, the mulling channel opening towards the exterior side of the first frame member, the first joining strip comprising a first web extending from an interior edge proximate the interior side of the first frame member to an exterior edge proximate the exterior side of the first frame member;

a second joining strip attached to the second frame member of the second fenestration unit, the second joining strip comprising a mulling channel aligned with the mull joint axis, the mulling channel opening towards the interior side of the second frame member such that the mulling channel on the first joining strip nests with the mulling channel on the second joining strip, wherein the mulling channel on the first joining strip and the mulling channel on the second joining strip prevent movement of the first frame member away from the second frame member along the separation axis, prevent movement of the first frame member towards the exterior side of the second frame member along the interior/exterior axis, and prevent movement of the second frame member towards the interior side of the first frame member along the interior/exterior axis, and wherein the second joining strip comprises a second web extending from an interior edge proximate the interior side of the second frame member to an exterior edge proximate the exterior side of the second frame member;

wherein the second frame member defines a second frame member mull surface facing the first frame member across the mull joint, the second frame member comprising a plurality of second frame member cavities extending into the second frame member in a direction away from the first frame member, wherein each second frame member cavity of the plurality of second member frame cavities is aligned with and extends along the mull joint axis, the plurality of second member frame cavities located between the interior and exterior sides of the second frame member;

wherein the first joining strip comprises a plurality of reinforcing ribs extending from the web of the first joining strip towards the first frame member, the plurality of reinforcing ribs located between the interior and exterior edges of the first joining strip, wherein each reinforcing rib of the plurality of reinforcing ribs extends into a selected first frame member cavity of the plurality of first frame member cavities such that each reinforcing rib of the plurality of reinforcing ribs is intersected by the first frame member mull plane such that the at least a portion of each reinforcing rib is located between the first frame member mull plane and the first frame member mull surface;

wherein a selected reinforcing rib of the plurality of reinforcing ribs defines a first retaining channel opening towards a selected side of the mull joint comprising one of the exterior side and the interior side of the first frame member;

wherein a selected first frame member cavity of the plurality of first frame member cavities comprises a first frame channel opening away from the selected side of the mull joint; wherein the first retaining channel mechanically interlocks with the first frame channel such that movement of the first joining strip away from the first frame member along the separation axis is prevented and movement of the first joining strip towards the selected side of the first frame member along the interior/exterior axis is prevented;

wherein the second frame member mull surface defines a second frame member mull plane extending between the interior side and the exterior side of the second frame member and along a length of the second frame member from the first end to the second end of the mull joint, wherein a mull joint thickness measured along the separation axis is defined by a distance between the first frame member mull plane and the second frame member mull plane at the interior sides of the first and second frame members, wherein the first and second joining strips define a joining strip thickness measured along the separation axis, and wherein the joining strip thickness measured through a selected reinforcing rib of the plurality of reinforcing ribs is greater than the mull joint thickness.

15. A compound fenestration assembly according to claim 14, wherein adjacent pairs of first frame member cavities of the plurality of first frame member cavities are separated by an intermediate support extending along the mull axis on the first frame member mull surface, and wherein the first frame channel is formed by the intermediate support.

16. A compound fenestration assembly according to claim 14, wherein the first retaining channel is located between the first frame member mull plane and the first frame member mull surface.

17. A compound fenestration assembly according to claim 14, wherein the first joining strip comprises an exterior flange located along the exterior edge of the web of the first joining strip and an interior flange located along the interior edge of the web of the first joining strip, wherein the exterior flange and the interior flange both extend away from the mull joint to a free edge in a direction aligned with the separation axis such that a portion of the first frame member of the first fenestration unit is located between the exterior flange and the interior flange of the first joining strip.

* * * * *